(12) United States Patent
Szczeszynski et al.

(10) Patent No.: US 12,525,816 B2
(45) Date of Patent: Jan. 13, 2026

(54) POWER CONVERTERS AND METHODS FOR PROTECTING POWER CONVERTERS

(71) Applicant: pSemi Corporation, San Diego, CA (US)

(72) Inventors: Gregory Szczeszynski, Nashua, NH (US); David Giuliano, Bedford, NH (US); Aichen Low, Cambridge, MA (US)

(73) Assignee: pSemi Corporation, San Diego, CA (US)

( * ) Notice: Subject to any disclaimer, the term of this patent is extended or adjusted under 35 U.S.C. 154(b) by 302 days.

(21) Appl. No.: 17/651,572

(22) Filed: Feb. 17, 2022

(65) Prior Publication Data

US 2022/0311326 A1   Sep. 29, 2022

Related U.S. Application Data

(60) Provisional application No. 63/165,519, filed on Mar. 24, 2021.

(51) Int. Cl.
*H02M 1/32* (2007.01)
*H02M 3/07* (2006.01)

(52) U.S. Cl.
CPC .............. *H02M 1/32* (2013.01); *H02M 3/07* (2013.01); *H02J 2207/30* (2020.01); *H02J 2207/40* (2020.01)

(58) Field of Classification Search
CPC ............. H02M 3/07; H02M 1/32; H02M 1/36
See application file for complete search history.

(56) References Cited

U.S. PATENT DOCUMENTS

| 6,275,958 | B1 * | 8/2001 | Carpenter | ............. H02M 3/158 714/48 |
| 7,157,956 | B2 | 1/2007 | Wei | |
| 7,233,473 | B2 | 6/2007 | Donaldson et al. | |
| 7,944,276 | B2 * | 5/2011 | Nakai | ..................... H02M 1/32 363/60 |

(Continued)

FOREIGN PATENT DOCUMENTS

| EP | 3696960 A1 | 8/2020 |
| TW | 201345132 A | 11/2013 |

OTHER PUBLICATIONS

Taiwan Intellectual Property Office, Office Action in related Taiwan Application No. 112105511, mailed Oct. 6, 2023.

(Continued)

*Primary Examiner* — Alex Torres-Rivera
(74) *Attorney, Agent, or Firm* — Haynes and Boone, LLP

(57) ABSTRACT

Disclosed embodiments may include a power converter having a first and a second terminal, a charge pump power conversion circuit, and a protection circuit. The first terminal may be to receive an input voltage. The second terminal may be to output an output voltage. The charge pump power conversion circuit may be electrically coupled between the first terminal and the second terminal, and to convert the input voltage to the output voltage. The protection circuit may be electrically coupled to the charge pump power conversion circuit. The protection circuit may include a first switching device to, in response to a control signal, block a power flow from the first terminal to the second terminal, and from the second terminal to the first terminal.

38 Claims, 15 Drawing Sheets

(56) References Cited

U.S. PATENT DOCUMENTS

| | | | |
|---|---|---|---|
| 8,248,045 B2 | 8/2012 | Shiu | |
| 8,619,445 B1 | 12/2013 | Low et al. | |
| 9,484,799 B2 | 11/2016 | Zhang et al. | |
| 10,122,274 B2 | 11/2018 | Marini et al. | |
| 10,693,367 B1 | 6/2020 | Chatterjee et al. | |
| 10,958,166 B1 | 3/2021 | Low et al. | |
| 2012/0086427 A1* | 4/2012 | Gotou | H02M 1/083 |
| | | | 323/311 |
| 2015/0318781 A1* | 11/2015 | Huang | H02M 1/4208 |
| | | | 363/44 |
| 2016/0028302 A1* | 1/2016 | Low | H02M 3/073 |
| | | | 363/50 |
| 2018/0083439 A1* | 3/2018 | Fitzgerald | H01L 23/3107 |
| 2018/0375457 A1* | 12/2018 | Kitamura | B62D 5/0463 |
| 2019/0356227 A1* | 11/2019 | Davison | H02M 3/158 |

OTHER PUBLICATIONS

Linear Technology, "Fixed Ratio High Power Inductorless (Charge Pump) DC/DC Controller", LTC7820 product datasheet, 2017. (28 pages).

Linear Technology, "Hybrid Step-Down Synchronous Controller", LTC7821 datasheet, 2017. (36 pages).

Texas Instruments, "I2C Controlled Single Cell High Efficiency 8-A Switched Cap Fast Chargers With ADC", BQ25970, BQ25971 product datasheet, Apr. 2020. (13 pages).

Maxim Integrated, "8A Dual-Phase Switched-Capacitor Converter", MAX77932C product datasheet, 2020. (38 pages).

* cited by examiner

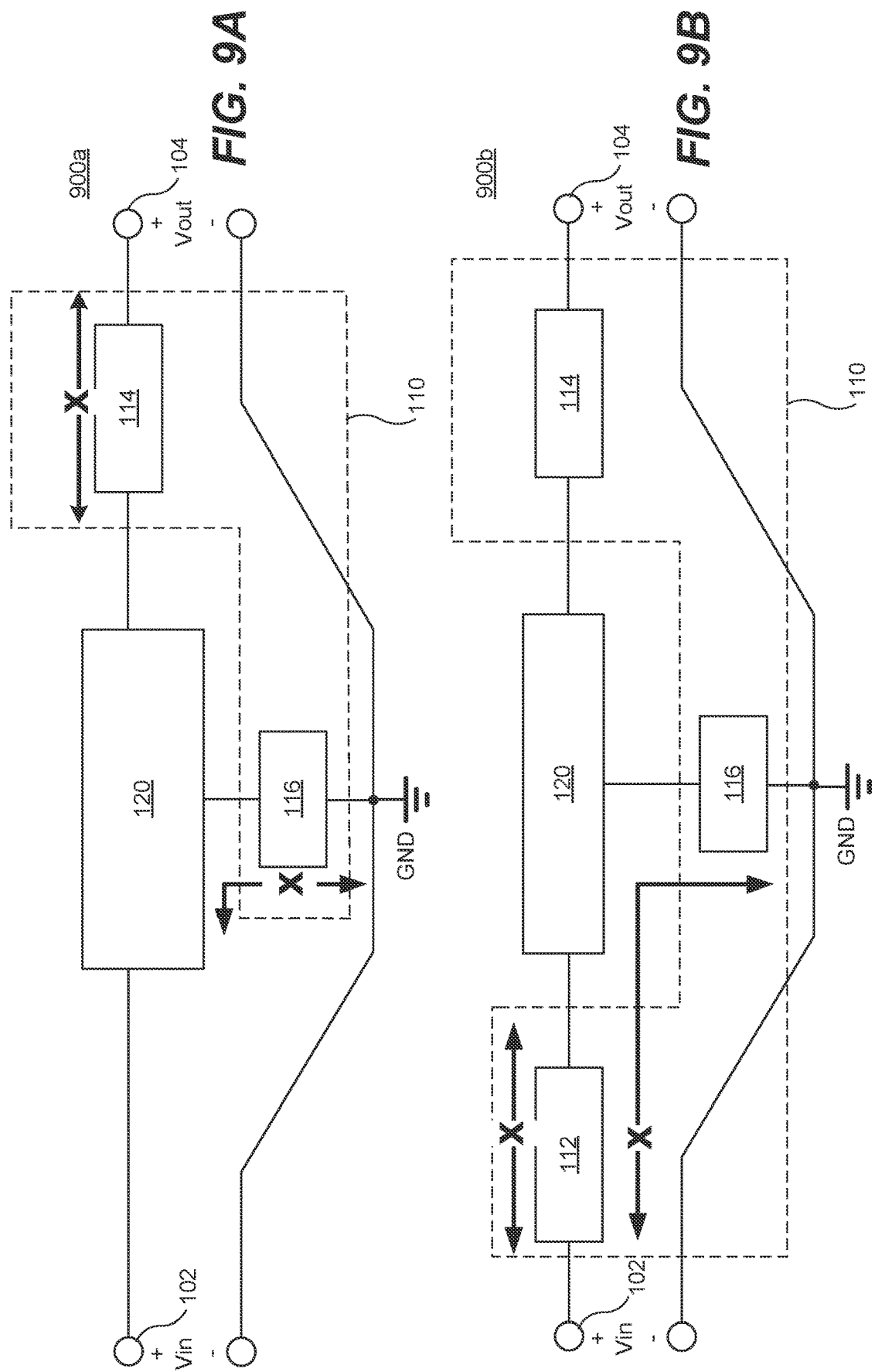

POWER CONVERTERS AND METHODS FOR PROTECTING POWER CONVERTERS

REFERENCE TO RELATED APPLICATION

This application claims priority of U.S. Provisional Application No. 63/165,519, filed on Mar. 24, 2021, entitled "BATTERY MANAGEMENT INFRASTRUCTURE," the entirety of which is incorporated by reference herein.

TECHNICAL FIELD

The present disclosure generally relates to power electronic devices. More particularly, the present disclosure relates to DC-DC power converters.

BACKGROUND

Many electronic products, particularly mobile computing and/or communication products and components (e.g., notebook computers, ultra-book computers, tablet devices, LCD and LED displays), require multiple voltage levels. For example, radio frequency transmitter power amplifiers may require relatively high voltages (e.g., 12V or more), and logic circuitry may require a low voltage level (e.g., 1-2V). Some other circuitry may require an intermediate voltage level (e.g., 5-10V). Power converters are often used to generate a lower or higher voltage from a common power source, such as a battery, in order to meet the power requirements of different components in electronic products.

SUMMARY

Embodiments of the present disclosure provide a power converter. The power converter includes a first and a second terminal, a charge pump power conversion circuit, and a protection circuit. The first terminal is to receive an input voltage. The second terminal is to output an output voltage. The charge pump power conversion circuit is electrically coupled between the first terminal and the second terminal, and to convert the input voltage to the output voltage. The protection circuit is electrically coupled to the charge pump power conversion circuit. The protection circuit includes a first switching device to, in response to a control signal, block a power flow from the first terminal to the second terminal, and from the second terminal to the first terminal.

Embodiments of the present disclosure provide a power converter. The power converter includes a controller, and a switched-capacitor network. The controller is to implement a deadtime interval based, at least in part on one or more timing signals, and to output a control signal in response to a detection of a fault, to block a power flow in either direction between a first terminal of the power converter and a second terminal of the power converter. The switched-capacitor network is electrically coupled to the controller and to convert a first voltage at the first terminal to a second voltage at the second terminal. The switched-capacitor network includes a plurality of switches to switch between a first configuration and a second configuration, wherein the controller controls the plurality of switches to connect a plurality of capacitors to form a first capacitor network in the first configuration, and to form a second capacitor network in the second configuration.

Embodiments of the present disclosure provide a power converter. The power converter includes a power conversion circuit, two or more switching circuits, and one or more detecting circuits. The power conversion circuit includes a first, second, and third terminals, and to convert a first voltage received from at least one of the first, second, and third terminals to a second voltage outputted at least of one of the first, second, third terminals of the power converter. Two or more switching circuits are electrically coupled to the power conversion circuit and to provide or block a bidirectional current path between one of the first, second, and third terminals and another one of the first, second, and third terminals according to a control signal in response to a fault. The one or more detecting circuits are electrically coupled to the one of the first, second, and third terminals and to detect whether the fault occurs.

Embodiments of the present disclosure provide a method for protecting a charge pump power converter that receives a first voltage from a first terminal and provides a second voltage on a second terminal. The method includes: converting, by the charge pump power converter, the first voltage to the second voltage; and in response to a control signal, blocking, by a protection circuit electrically coupled to the charge pump power conversion circuit, a power flow from the first terminal to the second terminal and from the second terminal to the first terminal.

Additional features and advantages of the disclosed embodiments will be set forth in part in the following description, and in part will be apparent from the description, or may be learned by practice of the embodiments. The features and advantages of the disclosed embodiments may be realized and attained by the elements and combinations set forth in the claims.

BRIEF DESCRIPTION OF THE DRAWINGS

Embodiments and various aspects of the present disclosure are illustrated in the following detailed description and the accompanying figures. It is noted that, in accordance with standard practice in the industry, various features are not drawn to scale. In fact, the dimensions of the various features may be arbitrarily increased or reduced for clarity of discussion.

FIG. 9A and FIG. 9B are block diagrams illustrating power converters, in accordance with embodiments of the present disclosure.

DETAILED DESCRIPTION

Figure 1:
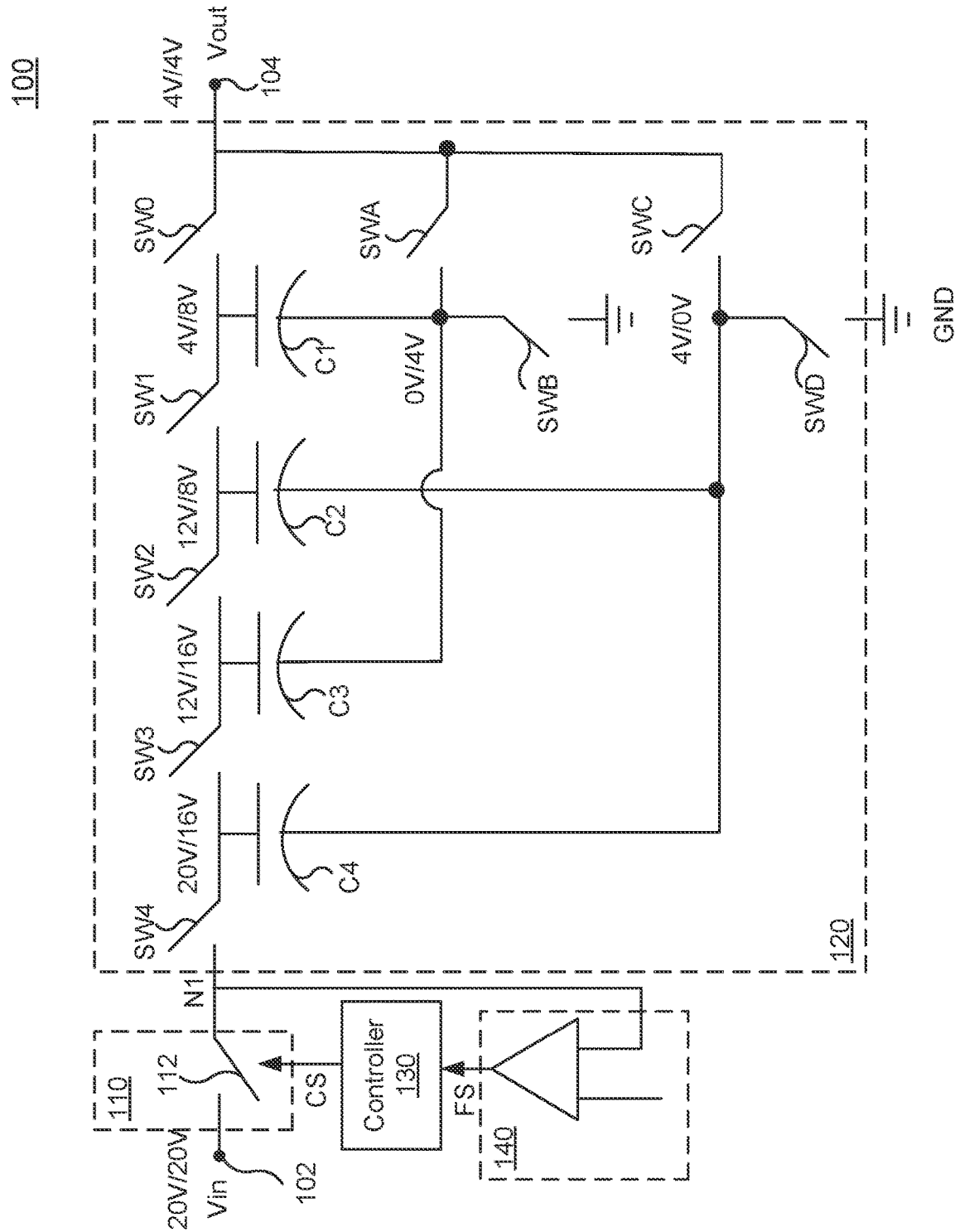
FIG. 1 is a diagram illustrating an exemplary power converter, in accordance with embodiments of the present disclosure.

The following disclosure provides many different exemplary embodiments, or examples, for implementing different features of the provided subject matter. Specific simplified examples of components and arrangements are described below to explain the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In this document, the term "coupled" may also be termed as "electrically coupled", and the term "connected" may be termed as "electrically connected". "Coupled" and "connected" may also be used to indicate that two or more elements cooperate or interact with each other.

Various embodiments of the present disclosure will be described with respect to embodiments in a specific context, namely a charge pump circuit. As used in this disclosure, the term "charge pump" refers to a switched-capacitor network configured to convert an input voltage to an output voltage. Examples of such charge pumps include cascade multiplier, Dickson, Ladder, Series-Parallel, Fibonacci, and Doubler switched-capacitor networks, all of which may be configured as a multi-phase or a single-phase network.

The concepts in the disclosure may also apply, however, to other types of power converters. Power converters which convert a higher input voltage power source to a lower output voltage level are commonly known as step-down or buck converters, because the converter is "bucking" the input voltage. Power converters which convert a lower input voltage power source to a higher output voltage level are commonly known as step-up or boost converters, because the converter is "boosting" the input voltage. In addition, some power converters, commonly known as "buck-boost converters," may be configured to convert the input voltage power source to the output voltage with a wide range, in which the output voltage may be either higher than or lower than the input voltage. In various embodiments, a power converter may be bi-directional, being either a step-up or a step-down converter depending on how a power source is connected to the converter. In some embodiments, an AC-DC power converter can be built up from a DC-DC power converter by, for example, first rectifying an AC input voltage to a DC voltage and then applying the DC voltage to a DC-DC power converter.

Voltage ratings of electrical components, such as capacitors, inductors, and/or transistors, within the power converter may be selected according to actual needs. However, under fault conditions, the input voltage may increase rapidly and suddenly, which can cause the electrical components to experience temporary over-voltage stress that results in damages to the power electronic devices. In other words, a fault may generate conditions where electrical components are subjected to current and/or voltage conditions that fall outside their designed and/or permitted range. Such conditions can cause components to fail or create an electrical hazard (e.g., high temperatures, arcing, electrical fires). It is therefore desirable to limit electrical components' exposure to fault conditions, for example, for device robustness and longevity as well as safety concerns. In some cases, a Metal-Oxide-Semiconductor Field-Effect Transistor (MOSFET) may be used as a protection switch to block undesired power flow when a fault occurs. However, the MOSFET device may only achieve one-way blocking to prevent power flowing from a voltage source to a load. That is, a MOSFET device alone may be unable to prevent the energy stored in the load side from flowing back to the voltage source, due to the current path provided by its intrinsic body-diode. When an input under-voltage fault or an output over-voltage fault occurs, undesired current may reversely flow back from the load to the voltage source and cause damages to the power conversion circuit.

In various embodiments of the present disclosure, one or more bidirectional power switches may be applied as part of the protection mechanism for the charge pump circuit. The bidirectional power switch can block the current in both directions to provide better protection when a fault condition occurs, and prevent potential damages to the electrical components in the power converter.

FIG. 1 is a diagram illustrating an exemplary power converter 100, in accordance with some embodiments of the present disclosure. As shown in FIG. 1, the power converter 100 may include a protection circuit 110, a charge pump power conversion circuit 120, a controller 130 and one or more detecting circuits 140. In some embodiments, the power converter 100 includes a clock (not shown) to generate one or more timing signals. The controller 130 may implement a deadtime interval based, at least in part on the one or more timing signals generated by the clock. The protection circuit 110 may be electrically coupled to the charge pump power conversion circuit 120. In some embodiments, the protection circuit 110 may include a switching device 112 between a first terminal 102 (e.g., an input terminal configured to receive an input voltage Vin) and the power conversion circuit 120 (e.g., at a node N1).

In the embodiments shown in FIG. 1, the charge pump power conversion circuit 120 may be a Dickson charge pump using a switching network having switches SW0-SW4, and SWA-SWD to control the connection of the supply voltage across the load through capacitors C1-C4. Particularly, the charge pump power conversion circuit 120 may be configured to step-down or step-up the input voltage Vin received from the first terminal 102 via the switching device 112 in an ON condition, by storing a portion or multiples of the input voltage Vin across capacitors C1-C4. Each capacitor C1-C4 may help create an intermediate voltage during part of the operating cycle. As the magnitude of the transformation increases, the number of capacitors used in the charge pump increases.

The switches SW0-SW4, SWA-SWD may be used to re-arrange the capacitors C1-C4 into different configurations. In some embodiments, the switches SW0-SW4, and SWA-SWD are configured to switch between two different configurations. Accordingly, capacitors C1-C4 can form a first capacitor network in response to the first configuration of the switches SW0-SW4, and SWA-SWD, and can form a second capacitor network in response to the second configuration of the switches SW0-SW4, and SWA-SWD. In some embodiments, the controller 130 controls and sequences transitions of the switches SW0-SW4, and SWA-SWD based on a timing signal received by the controller 130 in such a way as to incorporate any necessary deadtime or clock phase needed. For example, the controller 130 may implement a deadtime interval during the transition, to prevent all switches SW0-SW4, and SWA-SWD from conducting simultaneously when switching between the first configuration and the second configuration.

In FIG. 1, an exemplary Dickson charge pump in a 5:1 (step-down) configuration (or 1:5—step-up—if the power flow is reversed) is shown, but the present disclosure is not limited to such a ratio or type of conversion circuit. In various embodiments, the step-down or step-up configurations can be applied to all possible charge pump ratios. For example, in other embodiments, the Dickson charge pump may also be in a 2:1 configuration, with the input voltage Vin of 10V and the output voltage Vout of 5V.

During a first operation stage, switches SW0, SW2, SW4, SWB, and SWC are on, while remaining switches SW1, SW3, SW4, SWA and SWD are off in the first configuration. The first voltage label on each node indicates the voltage value of the node during the first operation stage. During a second operation stage, switches SW0, SW2, SW4, SWB, and SWC are off, while remaining switches SW1, SW3, SW4, SWA and SWD are on in the second configuration. The second voltage label on each node indicates the voltage value of the node during the second operation stage.

By controlling the switches SW0-SW4, SWA-SWD switching between the first and the second configurations in different operation stages, the charge pump power conversion circuit 120 may achieve the voltage conversion to output an output voltage Vout at a desired level (e.g., around 4V) in response to the input voltage Vin at a normal operating level (e.g., around 20V). It would be appreciated that voltage values provided in the embodiments of FIG. 1 are merely examples to aid understanding of this disclosure. In various embodiments, the number of switches and capacitors in the charge pump, the voltage ratings of the switches and the capacitors, the input voltage Vin, and the output voltage Vout may be designed based on practical needs for different applications.

Accordingly, the power conversion circuit 120 may output, via its output node, the output voltage Vout to a second terminal 104, which may be an output terminal configured to output the output voltage Vout to the next stage circuit, such as a regulator circuit, a filtering circuit, or a load, connected to the second terminal 104.

As shown in FIG. 1, each stage in the Dickson charge-pump sees a small fraction of the total voltage (e.g., 20V) at the high voltage side of the charge-pump. Accordingly, it is possible to use devices with a relatively lower voltage rating to improve the efficiency. However, under the circumstance that the high-voltage side, such as the input voltage Vin from the first terminal 102, rises rapidly and suddenly, the low-voltage switches SW0-SW4, SWA-SWD within the charge pump power conversion circuit 120 may experience temporary over-voltage stress that can result in damages to the power devices, which may occur during transient or fault conditions.

To protect the switches SW0-SW4, SWA-SWD and the capacitors C1-C4 from being exposed to voltages in excess of their breakdown voltages to prevent faulty circuit operations or damages to the power conversion circuit 120, the controller 130 can output a corresponding control signal CS to the protection circuit 110 in response to a fault signal FS. For example, in various embodiments, the fault signal FS may include an input under-voltage signal, an input over-voltage signal, an output under-voltage signal, an output over-voltage signal, a thermal shutdown signal, an input or output over-current signal, a timeout signal, or a charge pump capacitor under-voltage or over-voltage signal, or any other fault signal(s) FS indicating an undesired fault condition. Accordingly, in response to the control signal CS, the switching device 112 is configured to disconnect the current path between the first terminal 102 and the input node of the power conversion circuit 120.

In some embodiments, the fault signal FS indicating the abnormal fault condition may be generated by one or more detecting circuits 140 electrically coupled to the controller 130. Operations of the controller 130 and the detecting circuit(s) 140 will be explained in detail with accompanying drawings later.

As mentioned above, when a single p-type Metal-Oxide-Semiconductor Field-Effect Transistor (PMOS) or a single n-type Metal-Oxide-Semiconductor Field-Effect Transistor (NMOS) is used as the protection switch between the first terminal 102 and the power conversion circuit 120, the PMOS or the NMOS device can only prevent power flowing from the voltage source (e.g., the first terminal 102) to the load (e.g., the second terminal 104), but is unable to prevent the energy stored in the load side from flowing back to the voltage source, due to the intrinsic body-diode of the PMOS or NMOS device. The intrinsic body-diode provides a current path for the reverse power flow from the power conversion circuit 120 to the first terminal 102. Therefore, the PMOS or NMOS device only blocks the power flow from the first terminal 102 to the second terminal 104, but not the power flow in the opposite direction. Alternatively stated, the PMOS or the NMOS device can only block the power flow in one direction.

When an input under-voltage fault or an output over-voltage fault occurs, the undesired current may reversely flow back from the power conversion circuit 120 to the first terminal 102, and may potentially cause damages to the devices within the power conversion circuit 120, or damages to devices within a previous stage (e.g., an AC-DC converter or a DC power source) connected to the power converter 100.

In order to prevent the current from flowing back to the first terminal 102, in some embodiments, the switching device 112 may be a bidirectional disconnection switch. Particularly, the switching device 112 is configured to, in response to a control signal CS from the controller 130, block a power flow from the first terminal 102 (e.g., an input terminal configured to receive an input voltage Vin) to the second terminal 104 (e.g., an output terminal configured to output an output voltage Vout), and also block the power flow from the second terminal 104 to the first terminal 102. Alternately stated, the protection circuit 110 can support bidirectional current flow when the switching device 112 is in the ON condition, and support bidirectional voltage blocking when the switching device 112 is turned OFF. Because the protection circuit 110 blocks the current path in both directions, components in a previous stage (e.g., "upstream" components) before the power converter 100, components in the power conversion circuit 120, and components in a next stage (e.g., "downstream" components) after the power converter 100 can be protected from damages under the transient or fault conditions.

Figure 2:
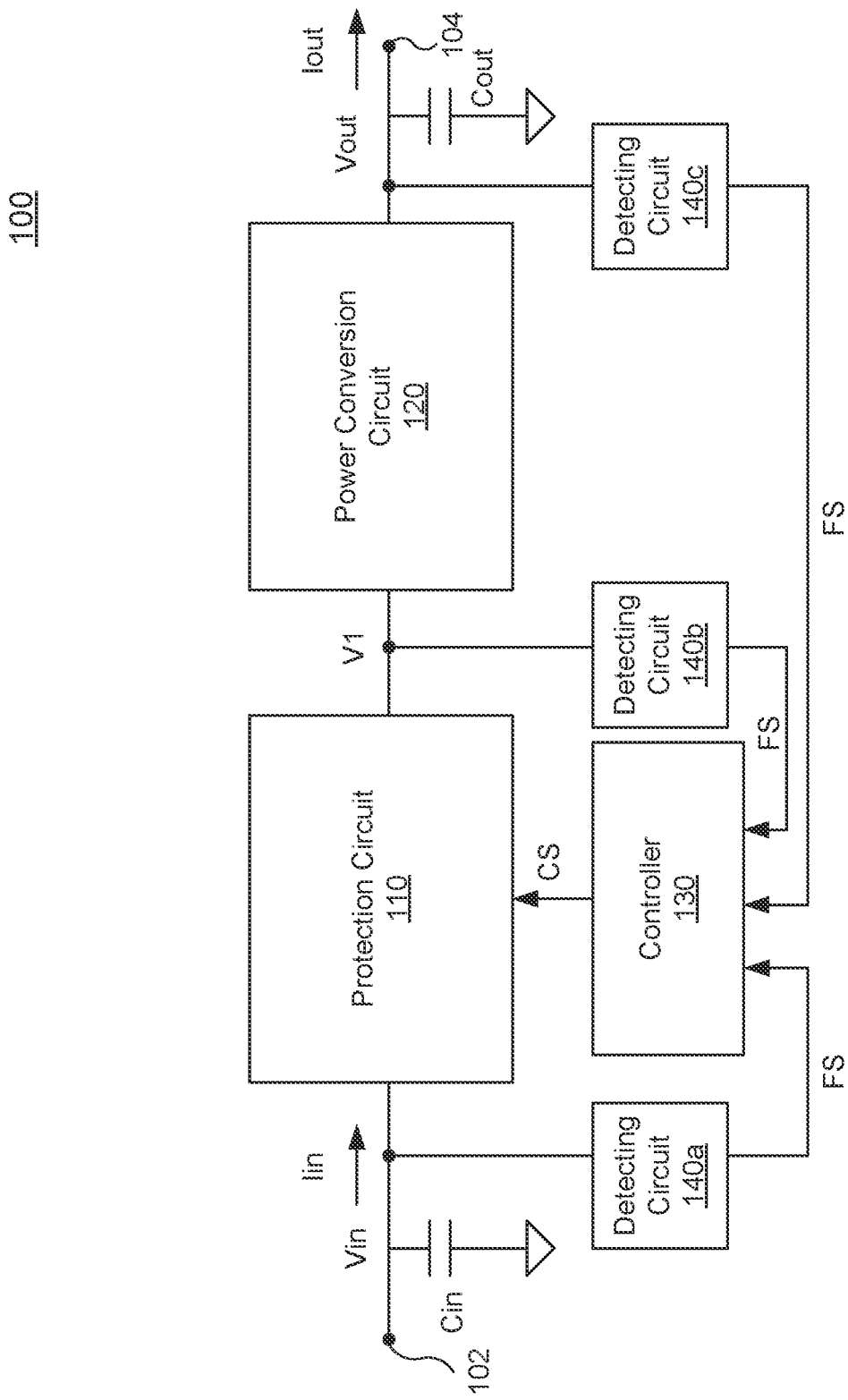
FIG. 2 is a block diagram illustrating a power converter, in accordance with embodiments of the present disclosure.

FIG. 2 is a block diagram illustrating the power converter 100, in accordance with some embodiments of the present disclosure. As shown in FIG. 2, in some embodiments, each of detecting circuit(s) 140a, 140b, and 140c may be electrically connected to the controller 130, and electrically connected to a proper node within the power converter 100 to detect voltage signal(s), current signal(s) or other signals within the power converter 100. Accordingly, the detecting circuit(s) 140a, 140b, and 140c may be configured to output the fault signal FS to the controller 130 based on these signals.

For example, the detecting circuit 140a may be coupled between the controller 130 and the first terminal 102 and configured to detect whether the input voltage Vin across an input capacitor Cin and/or the input current is within the proper range. The detecting circuit 140b may be coupled between the controller 130 and the input node of the power conversion circuit 120 and configured to detect whether the voltage V1 received by the power conversion circuit 120 is within the proper range. The detecting circuit 140c may be coupled between the controller 130 and the second terminal 104 and configured to detect whether the output voltage Vout across an output capacitor Cout and/or the output current Iout is within the proper range. It would be appreciated that the arrangements of the detecting circuit(s) 140a, 140b, and 140c are merely by examples and not meant to limit the present disclosure. In various embodiments, the detecting circuit(s) 140a, 140b, and 140c may output the fault signal FS according to a detection of the input voltage Vin, the output voltage Vout, a charge pump capacitor voltage, an input current Iin, an output current Iout, a thermal value, a soft-start timeout, or any other suitable signals or events.

Accordingly, in response to the fault signal FS outputted by any of the detecting circuit(s) 140a, 140b, and 140c, the controller 130 may output the control signal CS to turn off the bidirectional disconnection switch within the protection circuit 110, blocking the current path and the power flow between the first terminal 102 and the power conversion circuit 120 in both directions. For example, the detecting circuit(s) 140a, 140b, and 140c may be used to determine whether the current flow or the voltage levels in the power converter 100 are within a safe range. When the current flow exceeds one or more safe levels in either the forward or the reverse direction, or the input or output voltage is out of a safe range (e.g., under voltage or over voltage), the bidirectional disconnection switch is turned off accordingly to protect the power converter 100. In addition, during a start-up or an initialization stage, the power converter 100 may also keep the switch within the protection circuit 110 off, if an unsafe or undesired reverse power-flow would occur and flow from the output side back to the input side when the switch within the protection circuit 110 is turned on.

Figure 3:
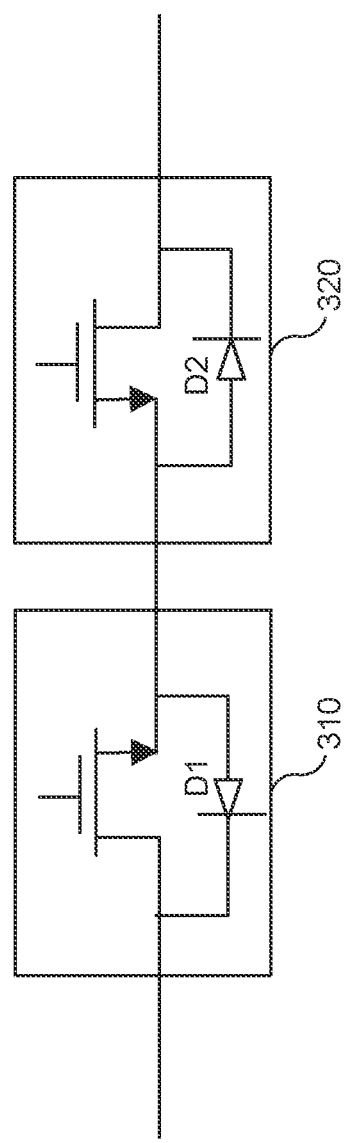
FIG. 3 is a diagram illustrating an exemplary switching device, in accordance with embodiments of the present disclosure.

FIG. 3 is a diagram illustrating an exemplary switching device 112 implemented in the protection circuit 110, in accordance with some embodiments of the present disclosure. As shown in FIG. 3, in some embodiments, the switching device 112 includes two power metal-oxide-semiconductor field-effect transistor (MOSFET) devices 310 and 320. The power MOSFET devices 310 and 320 have their body diodes D1 and D2 coupled in anti-series connection. The "anti-series connection" may indicate that either the anode terminals of the body diodes D1 and D2 are coupled to each other, or the cathode terminals of the body diodes D1 and D2 are coupled to each other. Accordingly, the body diodes D1 and D2 may have opposite forward directions. When the power MOSFET devices 310 and 320 are both off, the body diode D1 blocks the current in one direction, and the body diode D2 blocks the current in the other direction.

By this back-to-back configuration of power MOSFET devices 310 and 320, the switching device 112 can block the power flow in both directions between the input terminal and the output terminal of the power converter 100 of FIG. 1, and prevent potential damages caused in the fault conditions. In some embodiments, gate terminals of the power MOSFET devices 310 and 320 may be electrically coupled to each other and configured to receive the control signal CS, so the power MOSFET devices 310 and 320 can be controlled at the same time, but the present disclosure is not limited to this particular arrangement. In some other embodiments, the power MOSFET devices 310 and 320 may be controlled independently by separate signals from a controller (e.g., the controller 130 in FIG. 1).

In some embodiments, the power MOSFET devices 310 and 320 may be MOSFET devices with different power/voltage ratings, while in some other embodiments, the power MOSFET devices 310 and 320 may be MOSFET devices with the same power/voltage rating. Moreover, the power MOSFET devices 310 and 320 may also have different parameters, such as on-resistances, sizes, etc.

Figure 4A:
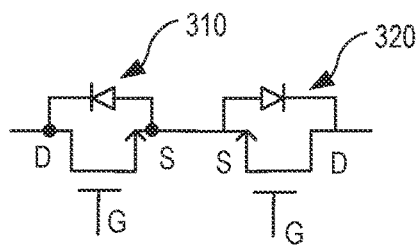
FIGS. 4A-4I respectively illustrate exemplary switching devices, in accordance with embodiments of the present disclosure.
Figure 4E:
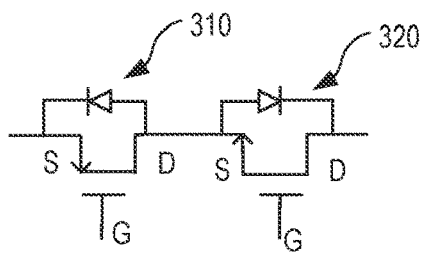
Figure 4B:
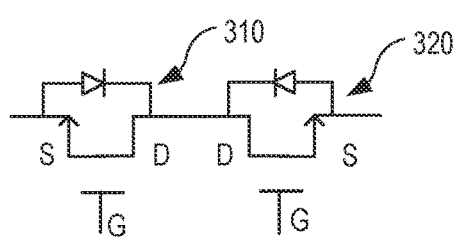

In addition, different types of MOSFET devices may be used and different arrangements may be applied to achieve the switching device 112 with a back-to-back configuration. FIGS. 4A-4I respectively illustrate exemplary switching devices 112 implemented by different types of MOSFET devices, in accordance with some embodiments of the present disclosure. As shown in FIG. 4A and FIG. 4B, in some embodiments, the power MOSFET devices 310 and 320 are both n-type MOSFET devices. In FIG. 4A, the n-type MOSFET devices 310 and 320 may be back-to-back connected in a common source configuration, in which the source terminals S of the MOSFETs are coupled to each other. In FIG. 4B, the n-type MOSFET devices 310 and 320 may be back-to-back connected in a common drain configuration, in which the drain terminals D of the MOSFETs are coupled to each other.

Figure 4F:
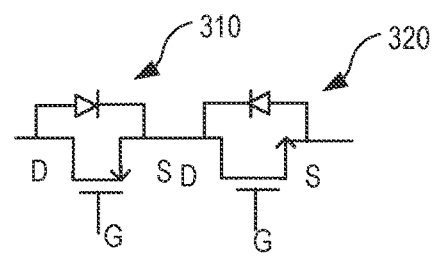
Figure 4C:
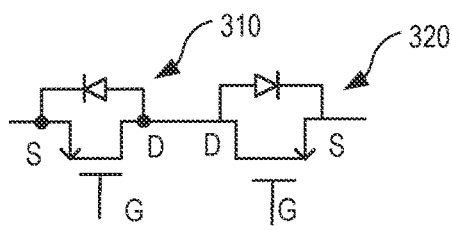
Figure 4G:
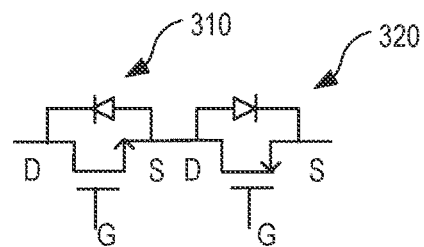
Figure 4D:
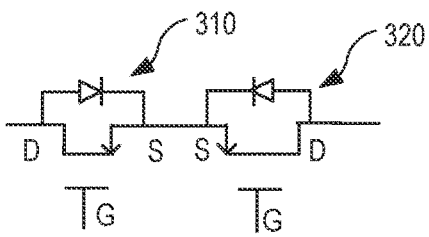

As shown in FIG. 4C and FIG. 4D, in some embodiments, the power MOSFET devices 310 and 320 may be both p-type MOSFET devices. In FIG. 4C, the p-type MOSFET devices 310 and 320 may be back-to-back connected in a common drain configuration, in which the drain terminals D of the MOSFETs are coupled to each other. In FIG. 4D, the p-type MOSFET devices 310 and 320 may be back-to-back connected in a common source configuration, in which the source terminals S of the MOSFETs are coupled to each other.

Figure 4H:
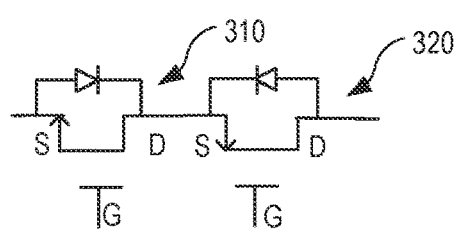
Figure 4I:
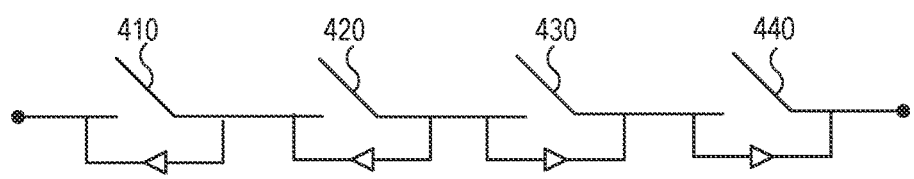

As shown in FIG. 4E to FIG. 4H, in some embodiments, the switching device 112 may be realized by one p-type MOSFET device and one n-type MOSFET device. For example, in FIG. 4E, the drain terminal of the p-type MOSFET device may be coupled to the source terminal of the n-type MOSFET device to achieve the back-to-back configuration with body diodes coupled in anti-series connection. In FIG. 4F, the source terminal of the p-type MOSFET device may be coupled to the drain terminal of the n-type MOSFET device to achieve the back-to-back configuration with body diodes coupled in anti-series connection. It would be appreciated that the placement order of the p-type MOSFET device and the n-type MOSFET device in the series connection can be changed, as shown in FIG. 4G and FIG. 4H, which are identical topologies to the embodiments of FIG. 4E and FIG. 4F. As shown in FIG. 4I, in some embodiments, the switching device 112 may include three or more switches 410, 420, 430 and 440 electrically coupled in series, in which body diodes of the switches 410, 420, 430 and 440 are coupled in anti-series connection.

Figure 5A:
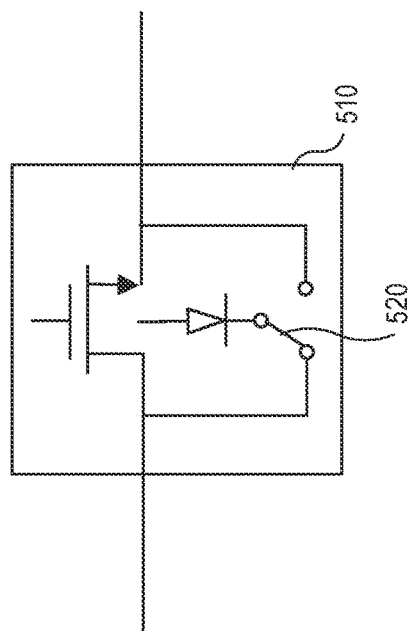
FIG. 5A is a diagram illustrating another exemplary switching device, in accordance with embodiments of the present disclosure.
Figure 5C:
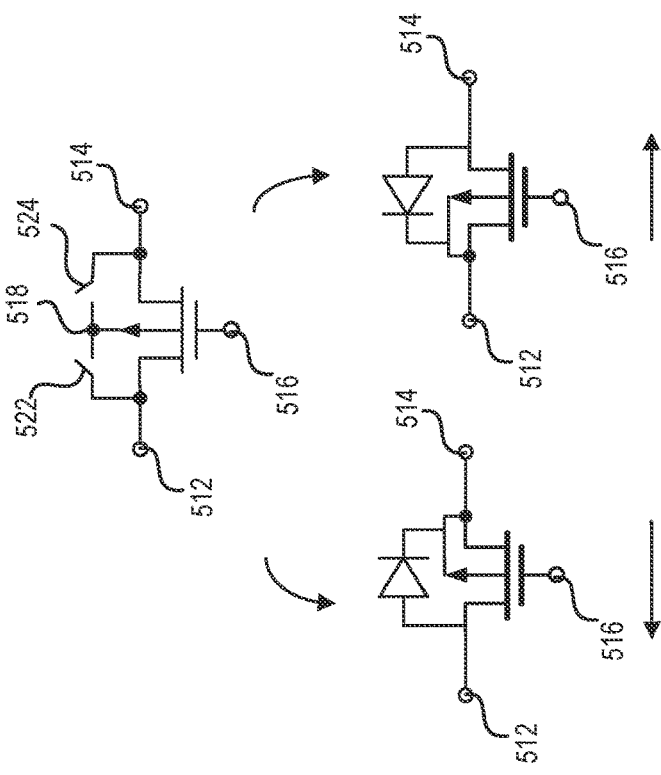
FIG. 5B and FIG. 5C respectively illustrate an n-type and a p-type power MOSFET device with the body bias selecting circuit, in accordance with embodiments of the present disclosure.
Figure 5B:
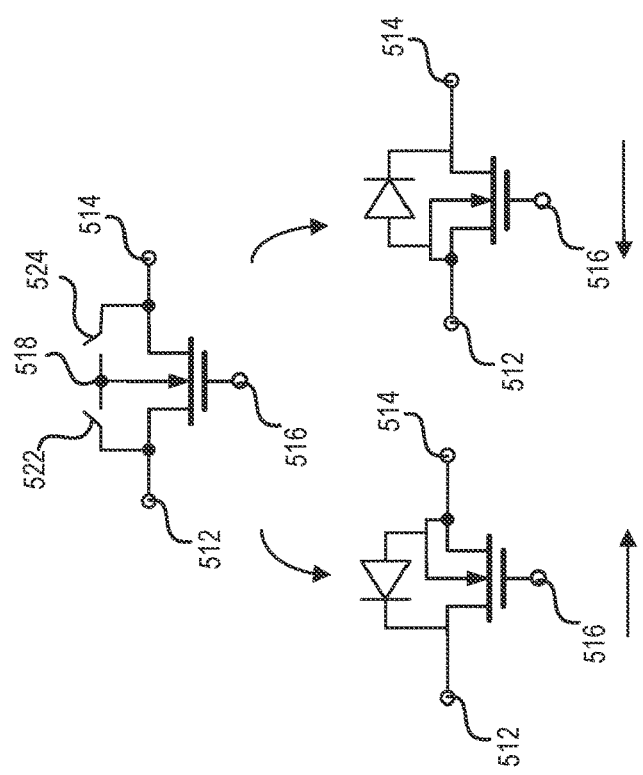

FIG. 5A is a diagram illustrating another exemplary switching device 112 implemented in the protection circuit 110, in accordance with some embodiments of the present disclosure. As shown in FIG. 5A, in some embodiments, the switching device 112 may include a power MOSFET device 510 with a body bias selecting circuit 520. The body bias selecting circuit 520 may be configured to bias a body terminal of the power MOSFET device 510. FIG. 5B and FIG. 5C respectively illustrate the n-type and p-type power MOSFET devices with the body bias selecting circuit 520, in accordance with some embodiments of the present disclosure.

As shown in FIG. 5B, when the power MOSFET device 510 is a n-type MOSFET device, the body bias selecting circuit 520 may be configured to selectively connect the body terminal 518 to a source or drain terminal 512 or 514 having a lower voltage. For example, the body bias selecting circuit 520 may include switches 522 and 524. When the voltage level of the first terminal 512 is lower than the voltage level of the second terminal 514, the switch 522 coupled between the body terminal 518 and the first terminal 512 is on, and the switch 524 coupled between the body terminal 518 and the second terminal 514 is off. Accordingly, a reverse bias across the diode present between the source and the drain terminals 512, 514 may be maintained. Similarly, when the voltage level of the first terminal 512 is higher than the voltage level of the second terminal 514, the switch 522 coupled between the body terminal 518 and the first terminal 512 is off, and the switch 524 coupled between the body terminal 518 and the second terminal 514 is on, which can maintain the reverse bias across the diode present between the source and the drain terminals 512, 514. In some other embodiments, it may also be possible to connect the body terminal 518 to a most negative node, such as a system ground, on to maintain the reverse bias across the diode present between the source and the drain terminals 512, 514.

As shown in FIG. 5C, when the power MOSFET device 510 is a p-type MOSFET device, the body bias selecting circuit 520 is configured to selectively connect the body terminal 518 to a source or drain terminal 512 or 514 having a higher voltage. For example, when the voltage level of the first terminal 512 is higher than the voltage level of the second terminal 514, the switch 522 coupled between the body terminal 518 and the first terminal 512 may be on, and the switch 524 coupled between the body terminal 518 and the second terminal 514 may be off. When the voltage level of the first terminal 512 is lower than the voltage level of the second terminal 514, the switch 522 coupled between the body terminal 518 and the first terminal 512 may be off, and the switch 524 coupled between the body terminal 518 and the second terminal 514 may be on. Accordingly, the reverse bias across the diode present between the source and the drain terminals 512, 514 can be maintained by the power MOSFET device 510 through the body bias.

Figure 6C:
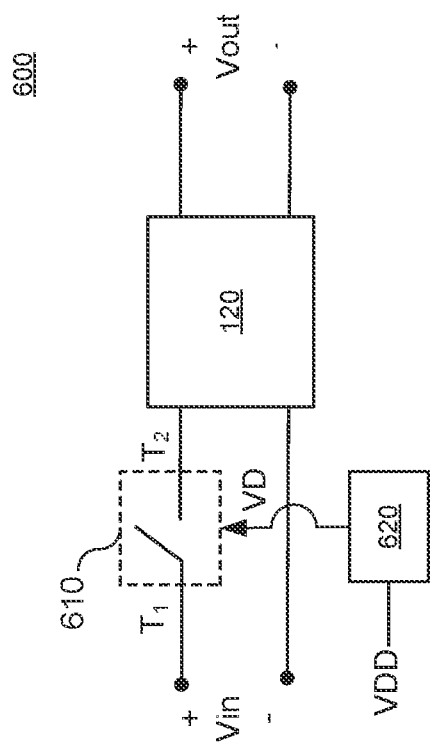
FIG. 6C is a diagram illustrating a power converter, in accordance with embodiments of the present disclosure.
Figure 6A:
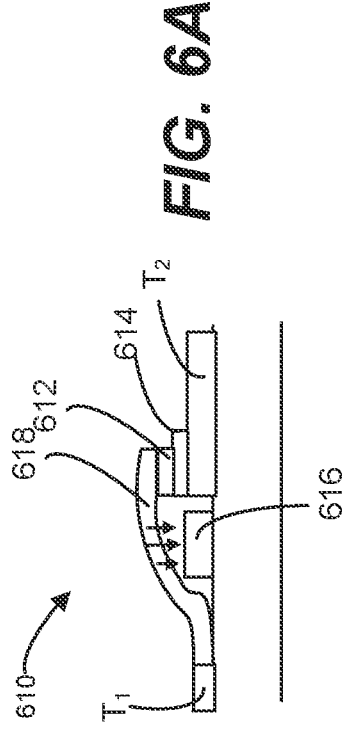
FIG. 6A and FIG. 6B are diagrams illustrating another exemplary switching device, in accordance with embodiments of the present disclosure.
Figure 6B:
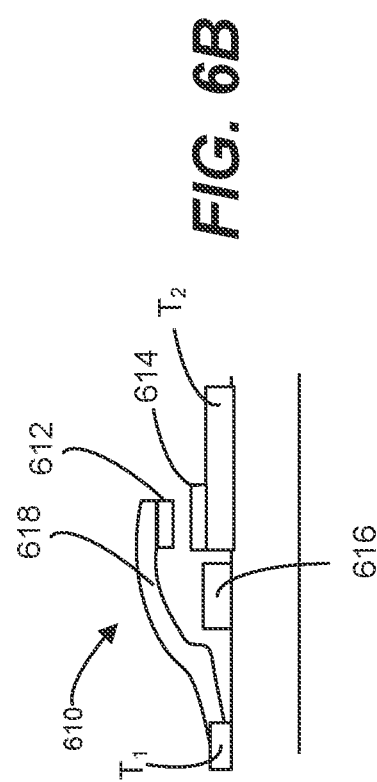

FIG. 6A and FIG. 6B are diagrams illustrating another exemplary switching device 112 implemented in the protection circuit 110, in accordance with some embodiments of the present disclosure. As shown in FIG. 6A and FIG. 6B, in some embodiments, the switching device 112 may include a micro-electromechanical system (MEMS) switch 610. The MEMS switch 610 includes a first contact 612 coupled to a first end T1 of the switching device 112, and a second contact 614 coupled to a second end T2 of the switching device 112. The MEMS switch 610 may be configured to be switched between an on state (e.g., a "close" state) and an off state (e.g., an "open" state) in response to the control signal CS.

FIG. 6A illustrates the MEMS switch 610 in the on state, in which the second contact 614 is electrically coupled to the first contact 612. FIG. 6B illustrates the MEMS switch 610 in the off state, in which the second contact 614 is electrically isolated from the first contact 612. The MEMS switch 610 can be switched from the first state shown in FIG. 6A to the second state shown in FIG. 6B in response to the control signal CS, in order to disconnect the two ends of the switching device 112 and thus blocks current in both directions.

In some embodiments, the MEMS switch 610 may be an electrostatic MEMS switch, but the present disclosure is not limited thereto. Various types of the MEMS switch may be used as the switching device 112 implemented in the protection circuit 110. In the embodiments shown in FIG. 6A and FIG. 6B, when a sufficient DC voltage is applied to a control gate electrode 616 of the MEMS switch 610, an electrostatic force may be generated, causing a suspended electrode 618 to bend downward, meeting the second contact 614 below. Thus, the first contact 612 and the second contact 614 may be connected, which permits current to flow across the MEMS switch 610. On the other hand, when no voltage is applied to the control gate electrode 616, the suspended electrode 618 may remain at rest, and the first contact 612 and the second contact 614 may be disconnected, in the off state shown in FIG. 6B.

FIG. 6C is a diagram illustrating a power converter 600 having the MEMS switch 610 implemented in the protection circuit 110, in accordance with some embodiments of the present disclosure. As shown in FIG. 6C, a high voltage charge pump circuit 620 may be electrically connected to the control gate electrode 616 of the MEMS switch 610 and configured to output a driving voltage VD (e.g., 100V) based on a power source VDD to generate the electrostatic force sufficient to cause the MEMS switch 610 to be operated in the on state as shown in FIG. 6A. When the corresponding signal CS is received, the high voltage charge pump circuit 620 may be configured to stop supplying the driving voltage VD, so that the MEMS switch 610 is in the off state as shown in FIG. 6B.

It would be appreciated that, in various embodiments, other types of switches may also be applied to implement the switching device 112 in the protection circuit 110, the embodiments illustrated in FIG. 3-FIG. 6C are examples and not meant to limit the present disclosure. For example, in some other embodiments, the switching device 112 may also include one or more of a bipolar junction transistor (BJT) power device, a high electron mobility transistor (HEMT) device, a GaN device, a junction gate field-effect transistor (JFET) device, or a metal semiconductor field effect transistor (MESFET) device. These types of transistor devices may function as bidirectional power switches having fast response time, and do not provide a reverse current path in an off state. In addition, the switching device 112 may also be implemented by any combination of the switching components mentioned above. As discussed above, in various applications, the switching components forming the switching device 112 may have different power/voltage ratings, on-resistances, sizes, etc.

Figure 7:
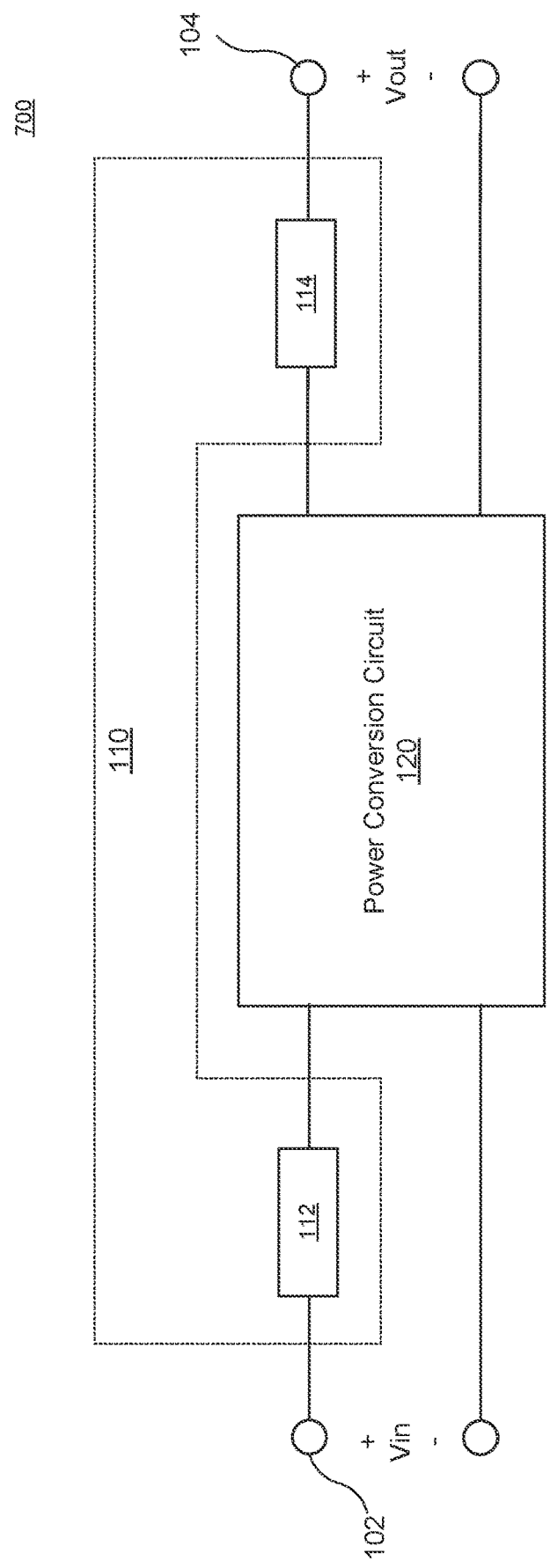
FIG. 7 is a block diagram illustrating a power converter, in accordance with embodiments of the present disclosure.

FIG. 7 is a block diagram illustrating a power converter 700, in accordance with some embodiments of the present disclosure. Compared to the power converter 100 of FIG. 1 and FIG. 2, in the power converter 700, the protection circuit 110 may include multiple switching devices 112 and 114 arranged at different locations. For example, one switching device 112 is coupled between the first terminal 102 and the input node of the power conversion circuit 120, and another switching device 114 is coupled between the second terminal 104 and the output node of the power conversion circuit 120. Similar to the switching device 112, the switching device 114 may be a bidirectional disconnection switch and configured to, in response to the control signal CS from the controller 130, block the power flow in both directions. Alternatively stated, the switching device 114 is configured to open the current path between the second terminal 104 and the output node of the power conversion circuit 120 in response to the control signal CS. The circuit configurations and/or components used to realize the switching device 114 are similar to those used to realize the switching device 112, which have been discussed in detail in FIG. 3 through FIG. 6C.

The switching devices 112 and 114 at both the high voltage side and the low voltage side of the power conversion circuit 120 may provide backup redundancy protection for the protection circuit 110, and further guarantee that when an abnormal condition is detected, the power conversion circuit 120 is electrically disconnected from the first terminal 102 and the second terminal 104, so no undesired current flows into the power conversion circuit 120.

Figure 8A:
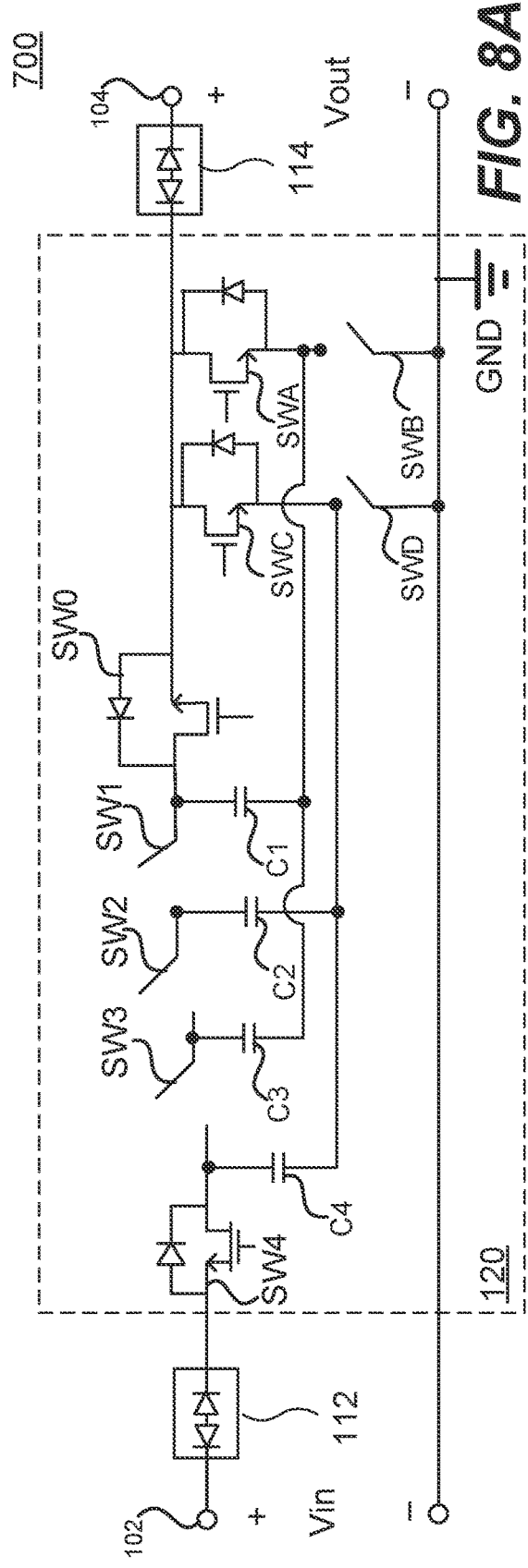
FIGS. 8A-8D are circuit diagrams illustrating exemplary circuit configurations of the power converter of FIG. 7, in accordance with embodiments of the present disclosure.

FIG. 8A is a circuit diagram illustrating an exemplary circuit configuration of the power converter 700 of FIG. 7, in accordance with some embodiments of the present disclosure. Similar to the embodiments of FIG. 1, in the embodiments of FIG. 8A, the power conversion circuit 120 can be a Dickson charge pump using switches SW0-SW4, SWA-SWD to control the connection of the supply voltage across the load through capacitors C1-C4. The Dickson charge pump may operate as discussed previously in relation to FIG. 1.

Figure 8B:
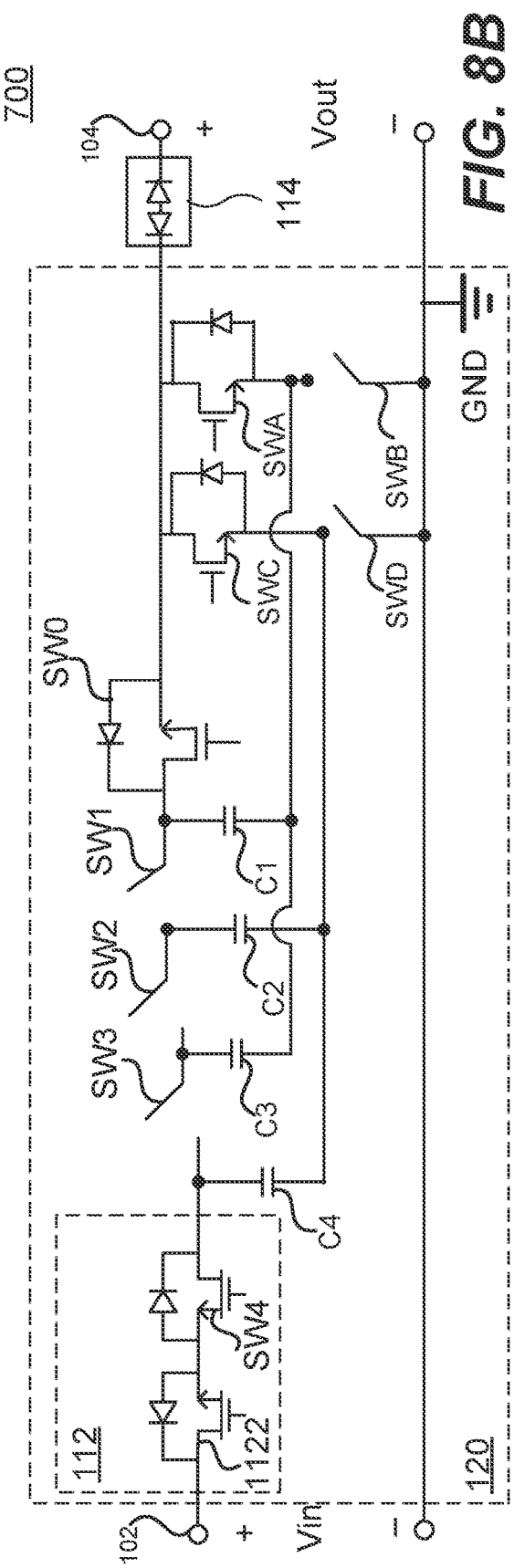
Figure 8C:
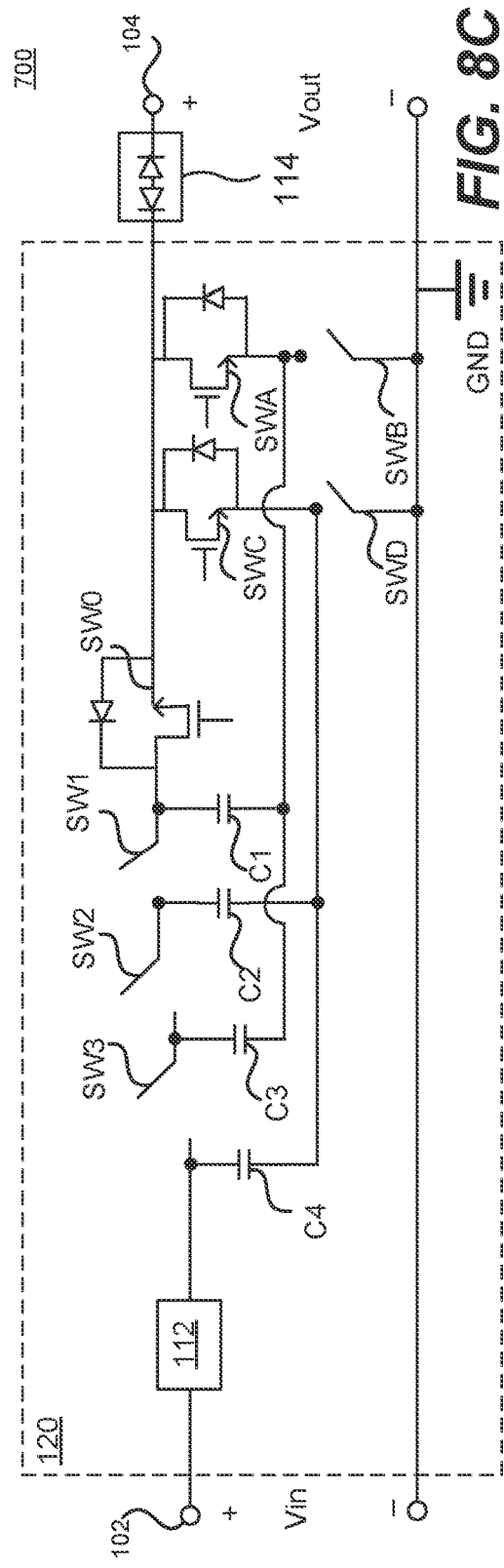
Figure 8D:
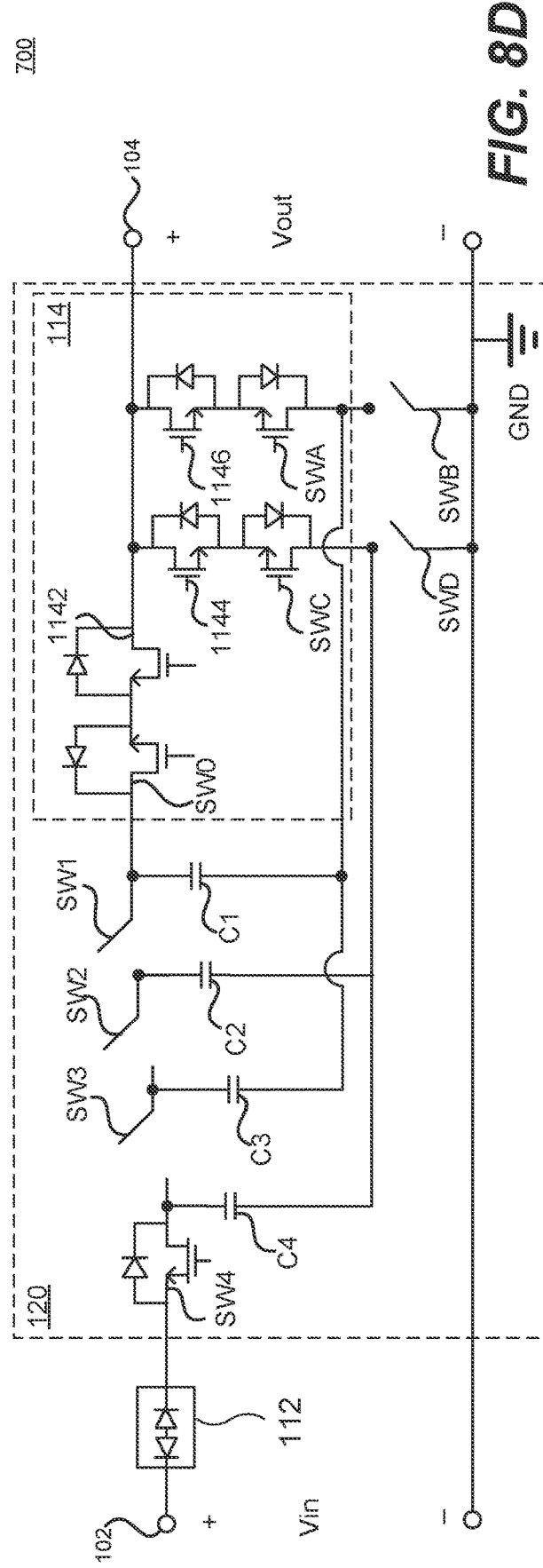

In some embodiments, the power conversion circuit 120 and the switching devices 112 and/or 114 may share one or more power switches to further reduce the cost and/or the chip area for the circuit design. FIG. 8B to FIG. 8D are circuit diagrams illustrating different exemplary circuit configurations of the power converter 700 of FIG. 7, in accordance with some embodiments of the present disclosure.

For example, compared to the embodiments of FIG. 8A, in the circuit configuration shown in FIG. 8B, the switching device 112 may include a power MOSFET device 1122 and one of the switches (e.g., switch SW4) in the switching network. Particularly, the power MOSFET device 1122 and the switch SW4 can be on or off at the same time. As shown in FIG. 8B, the switch SW4 is also implemented by a MOSFET device, and body diodes of the power MOSFET device 1122 and the switch SW4 are coupled in anti-series connection. Accordingly, when the power MOSFET device 1122 and the switch SW4 are both off, the body diodes in the back-to-back configuration block the current in both directions. As shown in FIG. 8B, the power MOSFET device 1122 and the switch SW4 may share the source so that a single gate-driver can be provided for driving gates of the power MOSFET device 1122 and the switch SW4, but the present disclosure is not limited thereto. In other alternative embodiments, the power MOSFET device 1122 and the switch SW4 may share the drains to achieve the anti-series connection. In some other embodiments, the switch SW4 in the first stage of the switching network may also be replaced by a bidirectional disconnection switch. Accordingly, the bidirectional disconnection switch can work as the protecting switch during the fault conditions, and also work as the switching element in the charge pump under normal operation. For example, as shown in the circuit configuration in FIG. 8C, the switching device 112 may be merged and integrated within the power conversion circuit 120 and achieve bidirectional blocking.

In the circuit configuration shown in FIG. 8D, the switching device 114 may include power MOSFET devices 1142, 1144, and 1146, and the switches SW0, SWA, and SWC in the switching network. Similar to the switching device 112 of FIG. 8B, the switching device 114 may be merged into the power conversion circuit 120 by sharing the switches SW0, SWA, and SWC. In FIG. 8D, the body diodes of the power MOSFET device 1142 and the switch SW0, which are on or off together, may form a back-to-back configuration in anti-series connection. The body diodes of the power MOSFET device 1144 and the switch SWC, which are on or off together, may form a back-to-back configuration in anti-series connection. The body diodes of the power MOSFET device 1146 and the switch SWA, which are on or off together, may form a back-to-back configuration in anti-series connection. Accordingly, the circuit may prevent current from flowing through the power conversion circuit 120 in both directions by the switching device 114.

FIG. 9A and FIG. 9B are block diagrams illustrating power converters 900a and 900b, in accordance with some embodiments of the present disclosure. Compared to the power converter 700 of FIG. 7, in the power converters 900a and 900b, the protection circuit 110 may further include another switching device 116 arranged and coupled between the power conversion circuit 120 and the ground terminal. Similar to the switching devices 112 and 114, the switching device 116 may also be a bidirectional disconnection switch and configured to, in response to the control signal CS from the controller 130, block the power flow in both directions. The circuit configurations and/or components used to realize the switching device 116 may be similar to those used to realize the switching devices 112 and 114.

During normal operations, the switching device 116 may be on and permit the power flow between the power conversion circuit 120 and the ground terminal GND. When a fault occurs, the controller 130 may output the corresponding control signal CS to one or more of the switching devices 112, 114, and 116 in the protection circuit 110 to turn off switching devices 112, 114, and 116 and may prevent any undesired current flows through the power conversion circuit 120 in both directions.

For example, in the embodiments shown in FIG. 9A, when the input voltage Vin is shorted, the capacitors within the power conversion circuit 120 may be prevented from discharging by turning off the switching device 116 coupled to the ground, and the current may be prevented from flowing between the first terminal 102 and the second terminal 104 by turning off the switching device 114 coupled to the second terminal 104. In the embodiments shown in FIG. 9B, when the input voltage Vin is shorted, the power converter 900b may turn off the switching device 112 coupled to the first terminal 102, which may prevent the capacitors within the power conversion circuit 120 from discharging, and may also prevent the current from flowing between the first terminal 102 and the second terminal 104. Switching devices 114 and 116 may also be off to provide backup redundancy protection for the protection circuit 110.

Figure 10A:
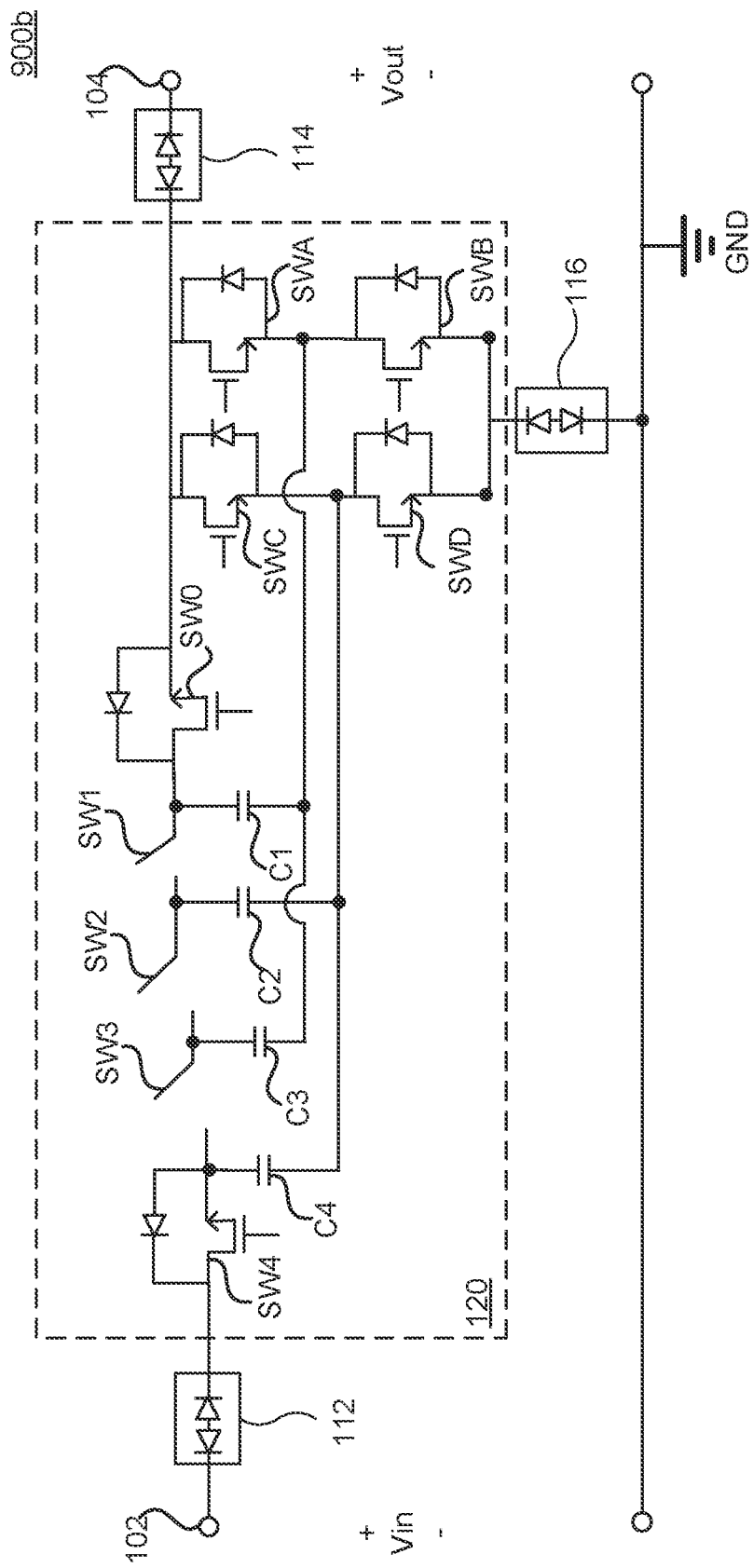
FIGS. 10A-10B are circuit diagrams illustrating exemplary circuit configurations of the power converter of FIG. 9B, in accordance with embodiments of the present disclosure.

FIG. 10A is a circuit diagram illustrating an exemplary circuit configuration of the power converter 900b of FIG. 9B, in accordance with some embodiments of the present disclosure. In the embodiments shown in FIG. 10A, the power conversion circuit 120 can be a Dickson charge pump using switches SW0-SW4, SWA-SWD to control the connection of the supply voltage across the load through capacitors C1-C4. As shown in FIG. 10A, the switching device 116 may be electrically connected between the ground terminal and a node connecting the switches SWB and SWD. In response to the control signal CS, the switching device 116 may be configured to open the current path between the ground terminal GND and the switching network. Accordingly, the power converter 900b may prevent the current from flowing through the power conversion circuit 120 via the ground terminal GND in both directions.

Figure 10B:
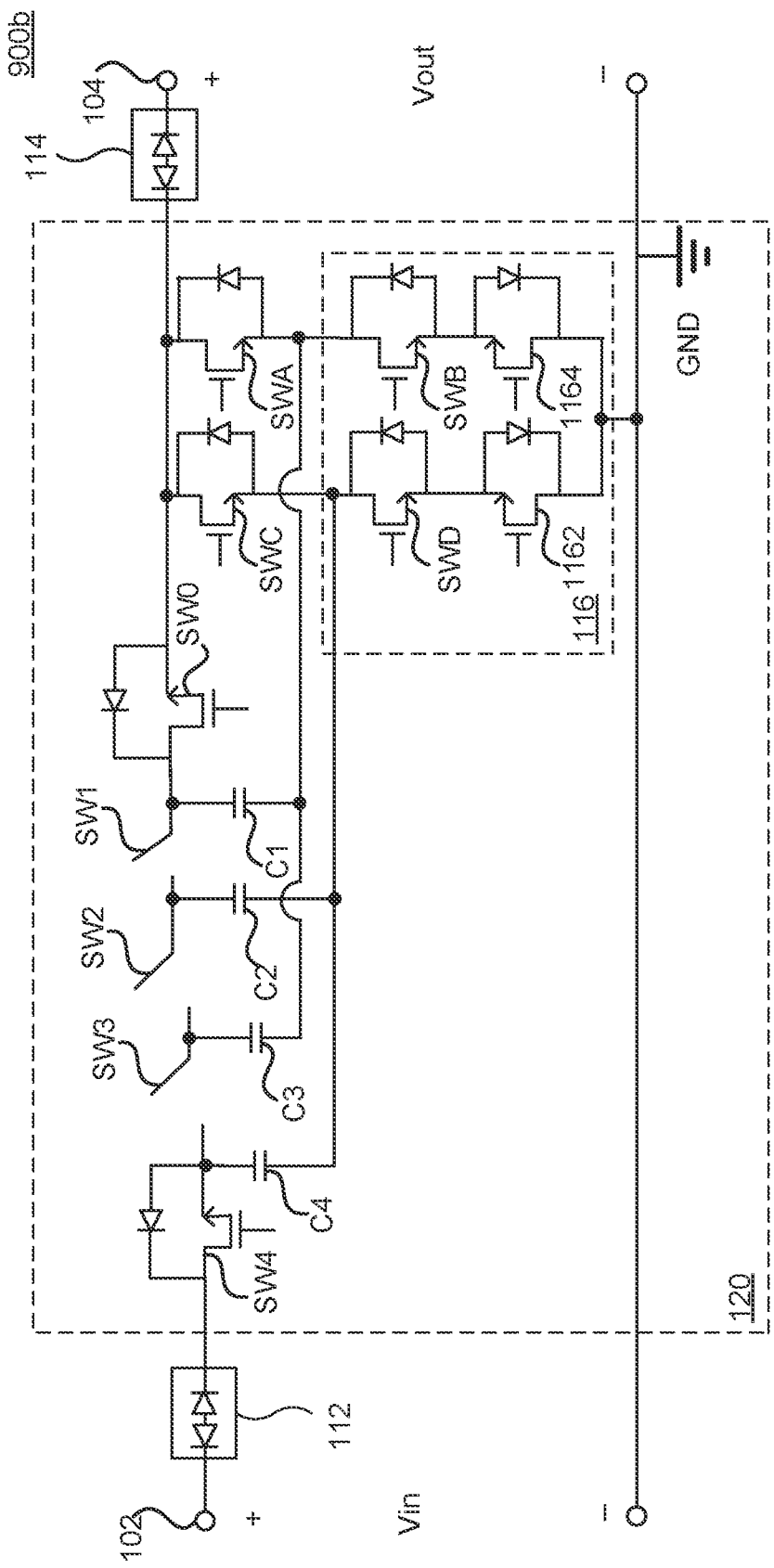

In some embodiments, the power conversion circuit 120 and the switching device 116 may also share one or more power switches to further reduce the cost and/or the chip area for the circuit design. FIG. 10B is a circuit diagram illustrating another exemplary circuit configuration of the power converter 900b of FIG. 9B, in accordance with some embodiments of the present disclosure. For example, compared to the embodiments of FIG. 10A, in the circuit configuration shown in FIG. 10B, the switching device 116 may include power MOSFET devices 1162 and 1164 and the switches SWB and SWD within the switching network. Similar to the switching device 112 of FIG. 8B and the switching circuit device of FIG. 8D, the switching device 116 can be merged into the power conversion circuit 120 by sharing the switches SWB and SWD. In FIG. 10B, the body diodes of the power MOSFET device 1162 and the switch SWD, which are switched on or off together, may form a back-to-back configuration in anti-series connection. The body diodes of the power MOSFET device 1164 and the switch SWB, which are switched on or off together, may form another back-to-back configuration in anti-series connection. Accordingly, the power converter 900b may prevent the current from flowing through the power conversion circuit 120 in both directions by controlling the switching device 116, which may be implemented by multiple power switches.

Figure 11:
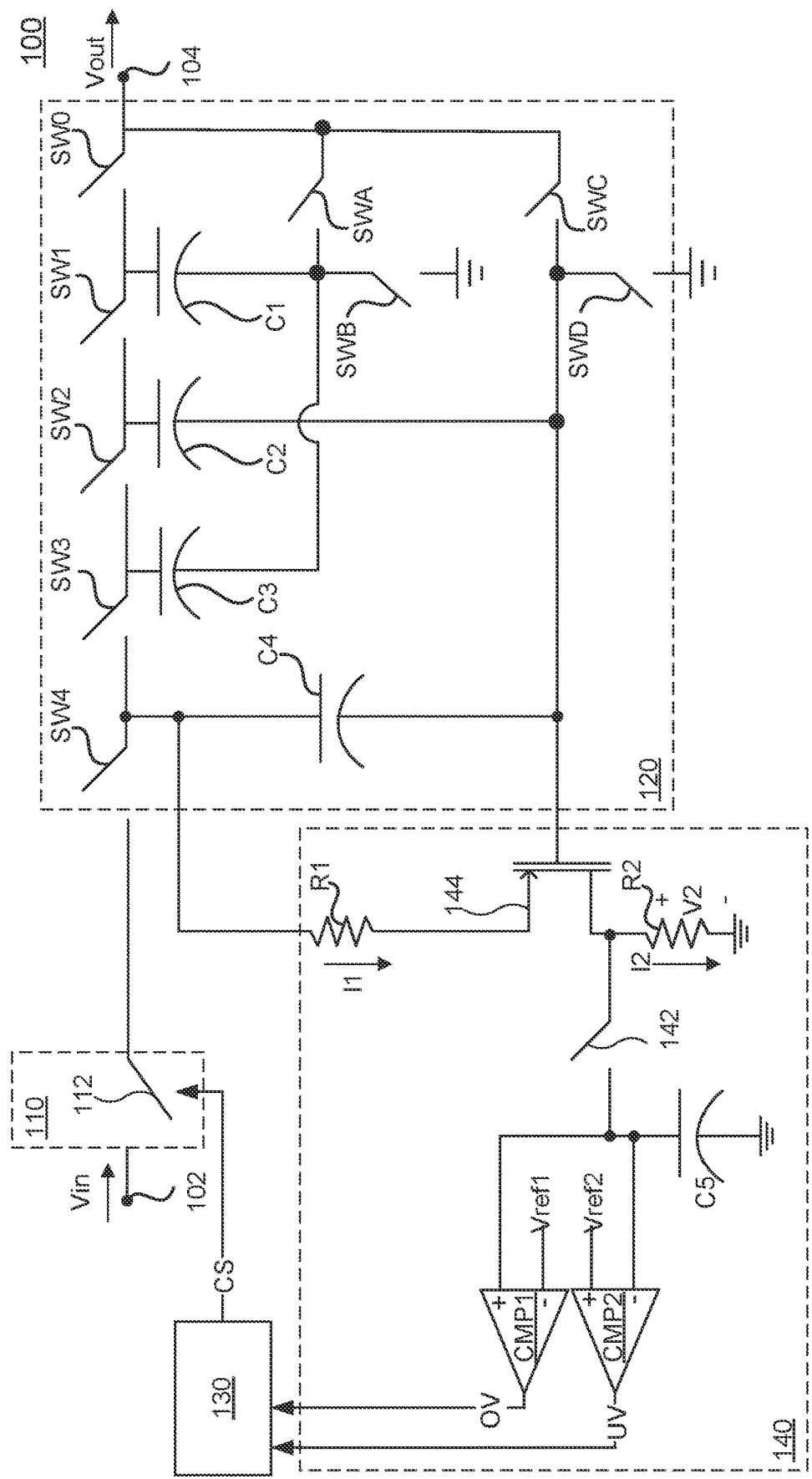
FIG. 11 is a circuit diagram illustrating an exemplary detecting circuit, in accordance with embodiments of the present disclosure.

FIG. 11 is a circuit diagram illustrating an exemplary detecting circuit 140 applied to the detection of a fault condition on the capacitor C4 in the power conversion circuit 120, in accordance with some embodiments of the present disclosure. In various embodiments, a similar circuit can be used to monitor the voltages on each of the capacitors C2, C3 and C4, or used to monitor the input voltage Vin or the output voltage Vout. Again, while a 5:1 step-down Dickson charge pump is depicted as the power conversion circuit 120 in the embodiments of FIG. 11, in some other embodiments, a step-up configuration can be applied to all possible charge pump ratios and to the Series-Parallel charge pump topology.

As shown in FIG. 11, the detecting circuit 140 may include resistors R1 and R2, a switch 142, a PMOS device 144, a filtering capacitor C5, and comparators CMP1 and CMP2. In some embodiments, the PMOS device 144 may be selected to operate at the higher voltage across C4. The resistor R1 may be electrically coupled between the first terminal of the capacitor C4 and a source terminal of the PMOS device 144. The resistor R2 may be electrically coupled between the ground terminal and a drain terminal of the PMOS device 144. A Gate terminal of the PMOS device 144 may be electrically coupled to the second terminal of the capacitor C4. The switch 142 may be electrically coupled between the drain terminal of the PMOS device 144 and the first terminal of the filtering capacitor C5 in the detecting circuit 140. A positive input terminal of the comparator CMP1 and a negative input terminal of the comparator CMP2 may also be electrically coupled to the first terminal of the filtering capacitor C5 to receive the sampled signal. A negative input terminal of the comparator CMP1 and a positive input terminal of the comparator CMP2 may be respectively configured to receive an over-voltage reference voltage Vref1 and an under-voltage reference voltage Vref2, which are the threshold voltages for determining whether an over-voltage fault or an under-voltage fault occurs.

Generally, the current I1 through the resistor R1 may be roughly proportional to the voltage across the capacitor C4, with the error of the source-gate voltage of the PMOS device 144. Current I2 through the resistor R2 may be substantially identical to the current I1. By properly selecting the value of the resistor R2, the voltage V2 across the resistor R2 may roughly provide a sampling signal of the voltage across the capacitor C4 and can be scaled down as desired. The switch 142, along with the filtering capacitor C5, may be used to allow a detection of the voltage V2 when the switch SWC is on (as the voltage V2 may be forced to be the ground voltage when the switch SWD is on). Comparators CMP1 and CMP2, along with the reference voltages Vref1 and Vref2, may form a "window comparator." An over-voltage fault signal OV or an under-voltage fault signal UV being asserted may indicate a fault condition, which may then trigger one or several of the protection mechanisms implemented.

For example, when the detecting circuit 140 that is electrically coupled to the controller 130 outputs one or more fault signals (e.g., the over-voltage fault signal OV or the under-voltage fault signal UV) when the fault occurs, the controller 130 may be configured to output the corresponding control signal CS in response to the one or more fault signals to turn off the switching device 112 in the protection circuit 110. In various embodiments, the detecting circuit 140 may output the fault signal(s) according to different signals, such as the input voltage Vin, the output voltage Vout, the charge pump capacitor voltage (e.g., a voltage across any one of the capacitors C1-C4), the input current, the output current, a thermal value, or a soft-start timeout. Alternatively stated, the fault signal(s) may include an input under-voltage signal, an input over-voltage signal, an output under-voltage signal, an output over-voltage signal, a thermal shutdown signal, an input or output over-current signal, a timeout signal, or a charge pump capacitor under-voltage or over-voltage signal, but the present disclosure is not limited to these specific types of fault signals, and other types of signals may be used in conjunction with the disclosed embodiments.

Figure 12:
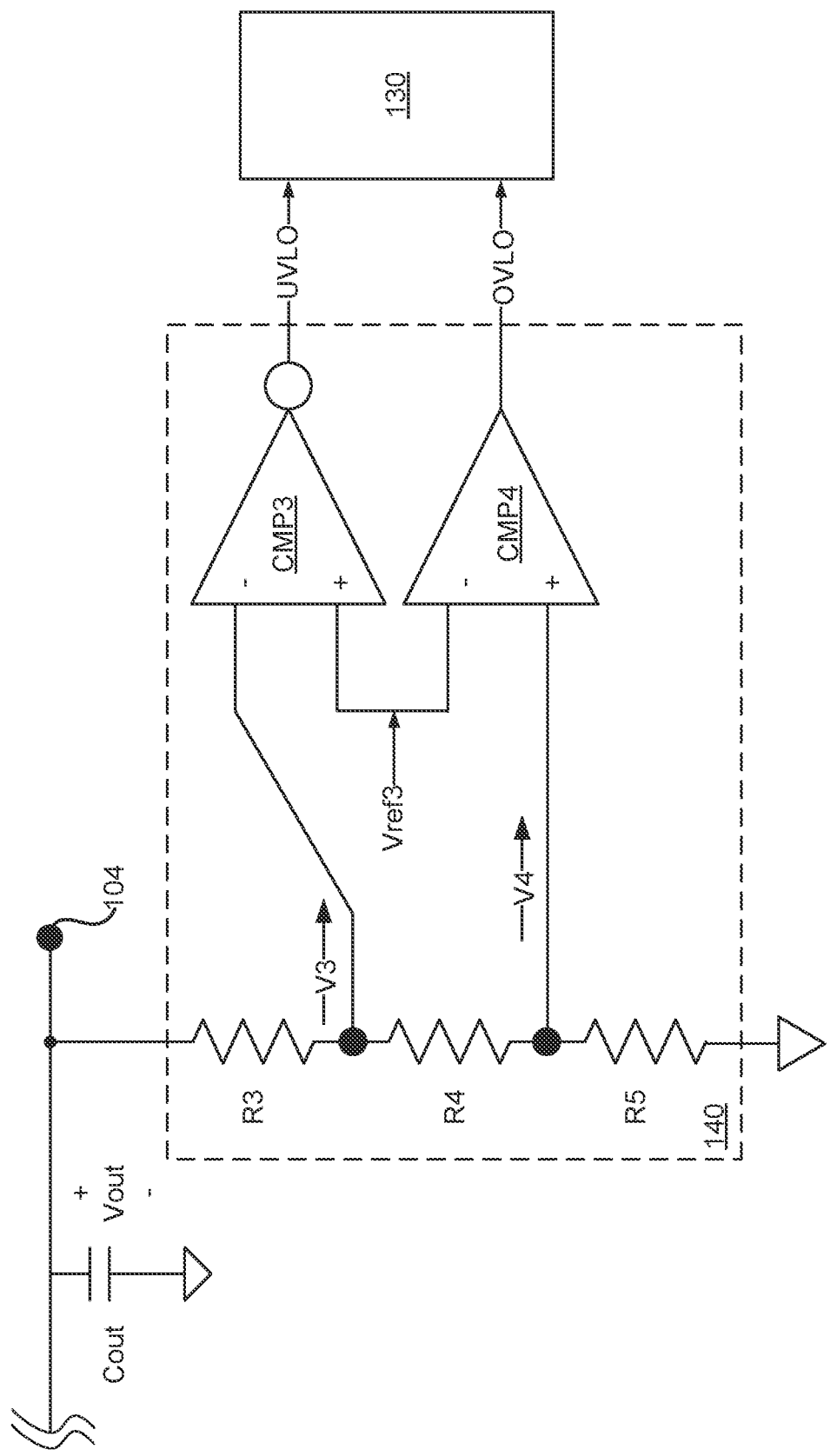
FIG. 12 is a circuit diagram illustrating another exemplary detecting circuit, in accordance with embodiments of the present disclosure.

FIG. 12 is a circuit diagram illustrating another exemplary detecting circuit 140 applied to the detection of a fault condition on the output voltage Vout, in accordance with some embodiments of the present disclosure. In some embodiments, a similar circuit can be used to monitor the input voltage Vin. As shown in FIG. 12, the detecting circuit 140 may include resistors R3, R4, and R5, and comparators CMP3 and CMP4. The resistors R3, R4, and R5 may be electrically connected in series between the second terminal 104 for outputting the output voltage Vout and the ground.

By properly selecting the value of the resistors R3, R4, and R5, the voltage V3 across the resistors R4 and R5, and the voltage V4 across the resistor R5, can be obtained. The voltages V3 and V4 may both be scaled down sampling signals of the output voltage Vout. For example, the value of the resistors R3, R4, and R5 may be selected to ensure that the sampled voltage V3 is greater than a reference voltage Vref3 (e.g., around 1.2V), and the reference voltage Vref3 is greater than the sampled voltage V4 when the output voltage Vout is within the normal operating range.

A positive input terminal of the comparator CMP3 and a negative input terminal of the comparator CMP4 are configured to receive the reference voltage Vref3, which is the threshold voltage for determining whether an over-voltage fault or an under-voltage fault occurs. A negative input terminal of the comparator CMP1 and a positive input terminal of the comparator CMP2 are respectively coupled to two terminals of the resistor R4 and configured to receive voltages V3 and V4. Accordingly, when the output voltage Vout rises and exceeds a predetermined safety value, the rising sampled voltage V4 may exceed the reference voltage Vref3 and may trigger the output terminal of the comparator CMP4 to output an Over Voltage Lockout signal OVLO. Similarly, when the output voltage Vout drops under a predetermined safety value, the falling sampled voltage V3 may drop to be lower than the reference voltage Vref3, and may trigger the output terminal of the comparator CMP3 to output an Under Voltage Lockout signal UVLO. Thus, the detecting circuit 140 in FIG. 12 may be configured to output the fault signals when a fault occurs on the output voltage Vout.

It should be appreciated that various types of detecting circuits or sensors may be applied for the fault detection, such as a temperature sensor for monitoring the temperature of the power converter. In some embodiments, the detecting circuits may further be configured to detect the fault level, or whether the fault is cleared, and output a corresponding signal to trigger different operations, such as automatic latch-off, auto restart/reset, etc. For example, these operations may be set in response to the fault conditions by one or more digital bits in the fault signals.

Figure 13:
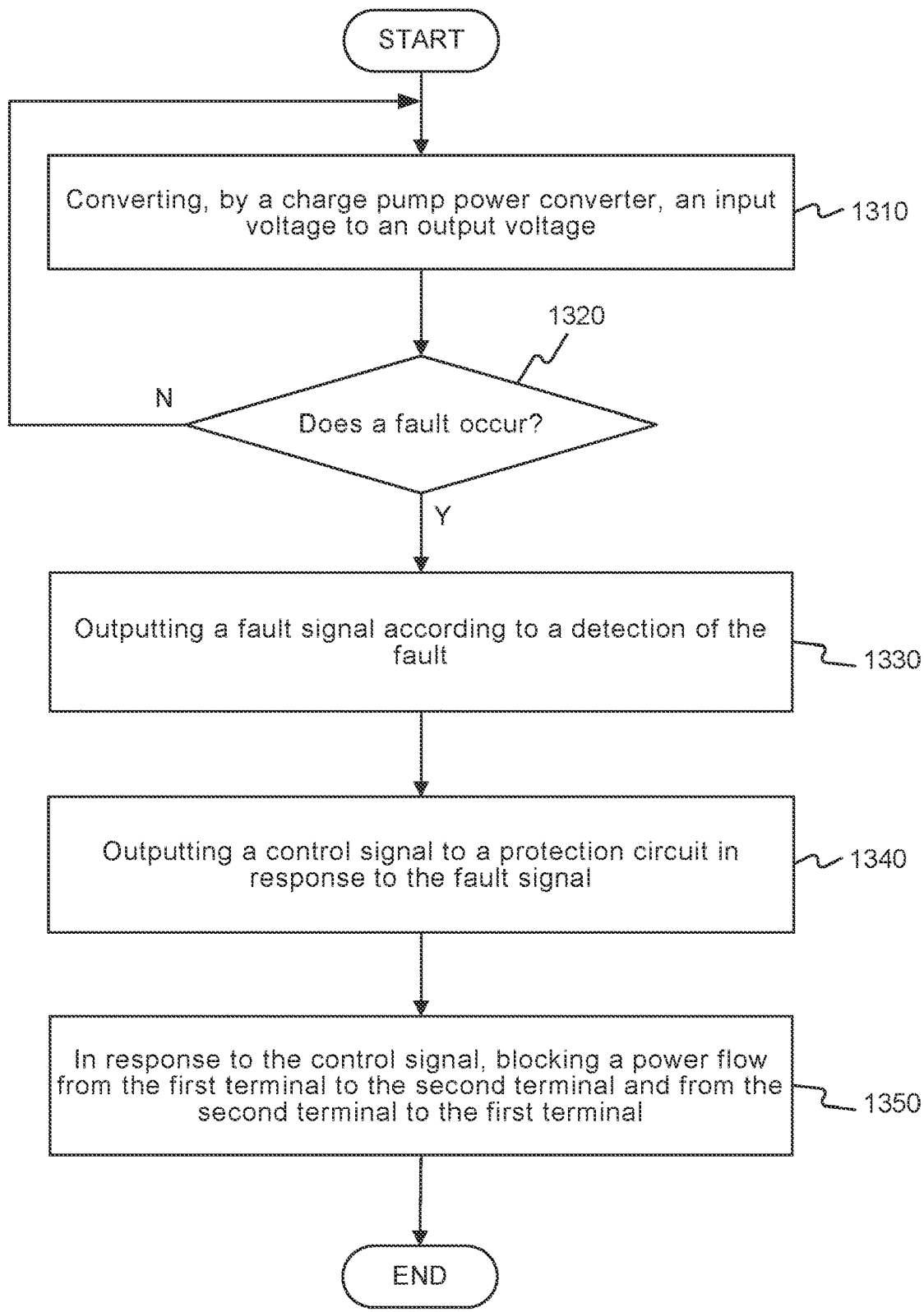
FIG. 13 is a flowchart of a method for protecting a power converter, in accordance with embodiments of the present disclosure.

FIG. 13 is a flowchart of a method 1300 for protecting a power converter, in accordance with some embodiments of the present disclosure. It is understood that additional operations may be performed before, during, and/or after the method 1300 depicted in FIG. 13, and that some other processes may only be briefly described herein. The method 1300 can be performed by circuits and components in a charge pump power converter, e.g., the power converters 100, 700, 900a and 900b illustrated in any of FIGS. 1-10B, but the present disclosure is not limited to these particular circuits, and the method 1300 may be performed with other circuits.

In operation 1310, the method 1300 may convert an input voltage to an output voltage. In some embodiments, operation 1310 may include a charge pump power converter (e.g., the power conversion circuit 120 in FIG. 1) converting an input voltage Vin received from a first terminal (e.g., the first terminal 102 in FIG. 1) to an output voltage, and providing the output voltage on a second terminal (e.g., the second terminal 104 in FIG. 1).

In operation 1320, the method 1300 may determine whether a fault has occurred. In some embodiments, operation 1320 may include one or more detecting circuits (e.g., detection circuit 140 in FIG. 11 or FIG. 12) monitoring the operations of the power converter and determines whether a fault occurs. For example, the detecting circuit(s) may detect voltage signals, current signals, thermal values, or soft-start timeout event of the power converter. In some embodiments, a microcontroller or processor may receive information from one or more sensors and include logic to evaluate whether the received sensor data corresponds to a fault state. For example, a processor may include predefined values or combinations of values for voltage, current, temperate, and/or timeout data defining when a fault state occurs. The processor may compare the data to the predefined conditions to determine whether the data matches with that preprogrammed as a fault state. In other examples, a processor may compare the sensor data to given limits, and when a certain number of limits are exceeded (e.g., voltage above 30 volts and temperature above 150 degrees Fahrenheit).

If no fault occurs (operation 1320—No), the method 1300 may proceed with the power converter repeating operations 1310 and 1320. When a fault is detected (operation 1320—Yes), the method 1300 may proceed to operation 1330, which may include the detecting circuit(s) outputting a fault signal. For example, the fault signal can be generated according to the detection of the input voltage, the output voltage, the charge pump capacitor voltage, the input current, the output current, the thermal value, the soft-start timeout, or any combination thereof.

In operation 1340, the method 1300 may include outputting a control signal. In some embodiments operation 1340 may include a controller (e.g., the controller 130 in FIG. 1) outputting a control signal to a protection circuit (e.g., the protection circuit 110 in FIG. 1) in response to the fault signal received from the detecting circuit(s). For example, disclosed embodiments may receive the fault signal generated in operation 1330 and, based on the fault signal, may generate and send a control signal to appropriate protection circuitry. In some embodiments, operation 1340 may include identifying particular protection circuitry to which the control signal should be sent. For example, method 1300 may be used in conjunction with circuits having multiple protection elements (e.g., switching devices 114 and 116 in power converter 900a, switching devices 112, 114, and 116 in power converter 900b), and operation 1340 may include identifying which switches to direct the control signal.

In operation 1350, the protection circuit electrically coupled to the power conversion circuit blocks the power flow in both directions, in response to the control signal outputted by the controller. Alternatively stated, the protection circuit blocks the power flow from the first terminal to the second terminal and the power flow from the second terminal to the first terminal.

In some embodiments, when an output over-voltage occurs and is detected, the power flow is blocked to avoid the energy flowing back to the input, until the output voltage returns to a safe level. For example, after the activation of the protection circuit, the load may continue to discharge the energy from the power converter with the switching charge-pump circuit, so that the output voltage and voltages within the charge-pump circuit fall accordingly back to proper voltage levels. When the output voltage is sufficiently low and would not cause the backflow current, the power converter may resume its normal operation and engage the power flow from the first terminal to the second terminal again, as the control signal is released.

By the operations described above, the protection circuit can block the current path in both directions, to protect components in the power conversion circuit, and also protect upstream components in the previous stage before the power converter and downstream components in the next stage following the power converter. Accordingly, the power converter can avoid potential damages under fault conditions, such as the current flow exceeding one or more safe levels in either the forward or the reverse direction, or the input or output voltage rapidly changing and moving out of a safe range. In addition, during a start-up or an initialization stage, the power converter may also keep the switching device off if turning on the switching device would result in unsafe or undesired reverse power-flow flowing from the output side back to the input side.

Disclosed methods and processes (e.g., method 1300) may be implemented in hardware, software instructions, or a combination of the two. In some embodiments, method 1300 may be implemented in fixed circuitry, such as with the circuitry discussed throughout this disclosure. In some embodiments, methods and process may be implemented through programmable instructions, such as volatile memory, nonvolatile memory, hard-coded media, and other mechanisms to store software instructions. In some embodiments, methods and process may be implemented in a combination of hardware and software. For example, fixed circuitry may be operated by a programmable controller. The controller may load instructions from on-board or off-board storage in order to control circuitry to collectively perform disclosed methods and process.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is also intended that the sequence of steps shown in figures are only for illustrative purposes and are not intended to be limited to any particular sequence of steps. As such, those skilled in the art can appreciate that these steps can be performed in a different order while implementing the same method.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable sub-combination or as suitable in any other described embodiments of the specification. Certain features described in the context of various embodiments are not to be considered essential features of those embodiments unless the embodiment is inoperative without those elements.

The embodiments may further be described using the following clauses:

1. A power converter, comprising:
   a first terminal to receive an input voltage;
   a second terminal to output an output voltage;
   a charge pump power conversion circuit electrically coupled between the first terminal and the second terminal, and to convert the input voltage to the output voltage; and
   a protection circuit electrically coupled to the charge pump power conversion circuit, the protection circuit comprising a first switching device to, in response to a control signal, block a power flow from the first terminal to the second terminal, and from the second terminal to the first terminal.
2. The power converter of clause 1, wherein the first switching device comprises a first power metal-oxide-semiconductor field-effect transistor (MOSFET) device and a second power MOSFET device having body diodes coupled in anti-series connection.
3. The power converter of clause 2, wherein the first power MOSFET device and the second power MOSFET device are MOSFET devices with different power ratings.
4. The power converter of clause 2 or 3, wherein the first power MOSFET device and the second power MOSFET device are both n-type MOSFET devices or both p-type MOSFET devices.
5. The power converter of any of clauses 2-4, wherein the first power MOSFET device and the second power MOSFET device are back-to-back connected in a common source configuration or in a common drain configuration.
6. The power converter of clause 1, wherein the first switching device comprises a first power MOSFET device with a body bias selecting circuit to bias a body terminal of the first power MOSFET device.
7. The power converter of clause 6, wherein the first power MOSFET device is a p-type MOSFET device, and the body bias selecting circuit is to selectively connect the body terminal to a source or drain terminal having a higher voltage.
8. The power converter of clause 6, wherein the first power MOSFET device is a n-type MOSFET device, and the body bias selecting circuit is to selectively connect the body terminal to a source or drain terminal having a lower voltage.
9. The power converter of clause 1, wherein the first switching device comprises:
   a micro-electromechanical system (MEMS) switch to be switched from a first state to a second state in response to the control signal, the MEMS switch comprising:
   a first contact coupled to a first end of the first switching device; and
   a second contact coupled to a second end of the first switching device, the second contact being electrically coupled to the first contact in the first state, and being electrically isolated from the first contact in the second state.
10. The power converter of clause 1, wherein the first switching device comprises one or more of a bipolar junction transistor (BJT) power device, a high electron mobility transistor (HEMT) device, a GaN device, a junction gate field-effect transistor (JFET) device, or a metal semiconductor field effect transistor (MESFET) device.

11. The power converter of any of clauses 1-10, wherein the first switching device is electrically coupled between the first terminal and the charge pump power conversion circuit or electrically coupled between the second terminal and the charge pump power conversion circuit.

12. The power converter of any of clauses 1-11, wherein the protection circuit further comprising:
a second switching device to, in response to the control signal, block the power flow from the first terminal to the second terminal, and from the second terminal to the first terminal,
wherein the first switching device is electrically coupled between the first terminal and the charge pump power conversion circuit, and the second switching device is electrically coupled between the second terminal and the charge pump power conversion circuit.

13. The power converter of any of clauses 1-11, wherein the protection circuit further comprising:
a second switching device electrically coupled between the charge pump power conversion circuit and a ground terminal and to, in response to the control signal, block the power flow between the charge pump power conversion circuit and the ground terminal.

14. The power converter of any of clauses 1-13, further comprising:
a controller to output the control signal to the protection circuit in response to a fault signal,
wherein the fault signal comprises an input under-voltage signal, an input over-voltage signal, an output under-voltage signal, an output over-voltage signal, a thermal shutdown signal, an input or output over-current signal, a timeout signal, or a charge pump capacitor under-voltage or over-voltage signal.

15. The power converter of clause 14, where the fault signal comprises a combination of two or more of: the input under-voltage signal, the input over-voltage signal, the output under-voltage signal, the output over-voltage signal, the thermal shutdown signal, the input or output over-current signal, the timeout signal, or the charge pump capacitor under-voltage or over-voltage signal.

16. The power converter of clause 14 or 15, further comprising:
one or more detecting circuits electrically coupled to the controller and to output the fault signal according to a detection of the input voltage, the output voltage, a charge pump capacitor voltage, an input current, an output current, a thermal value, or a soft-start timeout.

17. A power converter, comprising:
a controller to implement a deadtime interval based, at least in part on one or more timing signals, and to output a control signal in response to a detection of a fault, to block a power flow in either direction between a first terminal of the power converter and a second terminal of the power converter; and
a switched-capacitor network electrically coupled to the controller and to convert a first voltage at the first terminal to a second voltage at the second terminal, the switched-capacitor network comprising:
a plurality of switches to switch between a first configuration and a second configuration, wherein the controller controls the plurality of switches to connect a plurality of capacitors to form a first capacitor network in the first configuration, and to form a second capacitor network in the second configuration.

18. The power converter of clause 17, further comprising:
a first switching device electrically coupled to the first terminal or the second terminal, and to open a current path between the switched-capacitor network and the first terminal or the second terminal in response to the control signal,
wherein the first switching device comprises at least one of the plurality of switches in the switched-capacitor network.

19. The power converter of clause 18, further comprising:
a second switching device coupled to a ground terminal and to open a current path between the ground terminal and the switched-capacitor network in response to the control signal, wherein the second switching device comprises at least one of the plurality of switches in the switched-capacitor network.

20. The power converter of any of clauses 17-19, wherein the plurality of switches comprises:
a first power metal-oxide-semiconductor field-effect transistor (MOSFET) device and a second power MOSFET device having body diodes coupled in anti-series connection and to open a current path between the first terminal and the second terminal in response to the control signal.

21. The power converter of clause 20, wherein the plurality of switches comprises:
a third power MOSFET device and a fourth power MOSFET device having body diodes coupled in anti-series connection and to open a current path between the first terminal and a ground terminal in response to the control signal.

22. The power converter of any of clauses 17-21, further comprising:
one or more detecting circuits electrically coupled to the controller and to output one or more fault signals when the fault occurs according to the first voltage, the second voltage, a charge pump capacitor voltage, an input current, an output current, a thermal value, or a soft-start timeout,
wherein the controller is to output the control signal in response to the one or more fault signals.

23. The power converter of clause 22, wherein the one or more fault signals comprises an input under-voltage signal, an input over-voltage signal, an output under-voltage signal, an output over-voltage signal, a thermal shutdown signal, an input or output over-current signal, a timeout signal, or a charge pump capacitor under-voltage or over-voltage signal.

24. A power converter, comprising:
a power conversion circuit comprising a first, second, and third terminals, and to convert a first voltage received from at least one of the first, second, and third terminals to a second voltage outputted at least of one of the first, second, third terminals of the power converter;
two or more switching circuits electrically coupled to the power conversion circuit and to provide or block a bidirectional current path between one of the first, second, and third terminals and another one of the first, second, and third terminals according to a control signal in response to a fault; and
one or more detecting circuits electrically coupled to the one of the first, second, and third terminals and to detect whether the fault occurs.

25. The power converter of clause 24, wherein the two or more switching circuits comprise a pair of power metal-oxide-semiconductor field-effect transistor (MOSFET) devices having body diodes coupled in anti-series connection.
26. The power converter of clause 24, wherein the two or more switching circuits comprise a first power MOSFET device with a body bias selecting circuit to bias a body terminal of the first power MOSFET device.
27. The power converter of clause 24, wherein the two or more switching circuits comprise a micro-electromechanical system (MEMS) switch to be switched between an on state and an off state in response to the control signal.
28. The power converter of clause 24, wherein the two or more switching circuits comprise one or more of a bipolar junction transistor (BJT) power device, a high electron mobility transistor (HEMT) device, a GaN device, a junction gate field-effect transistor (JFET) device, or a metal semiconductor field effect transistor (MESFET) device.
29. The power converter of any of clauses 24-28, wherein the two or more switching circuits comprise:
a first switching device electrically coupled between the power conversion circuit and the one of the first, second, and third terminals and to disconnect the power conversion circuit from the one of the first, second, and third terminals in response to the fault; and
a second switching device electrically coupled between the power conversion circuit and the another one of the first, second, and third terminals and to disconnect the power conversion circuit from the another one of the first, second, and third terminals in response to the fault.
30. The power converter of clause 29, wherein the two or more switching circuits comprises:
a third switching device electrically coupled between the power conversion circuit and yet another one of the first, second, and third terminals and to disconnect the power conversion circuit from the yet another one of the first, second, and third terminals in response to the fault.
31. The power converter of any of clauses 24-30, wherein the power conversion circuit and one of the two or more switching circuits share at least one power switch.
32. The power converter of any of clauses 24-31, wherein the power conversion circuit comprises a switched-capacitor network, the switched-capacitor network comprising:
a plurality of switches to switch between a first configuration and a second configuration; and
a plurality of capacitors forming a first capacitor network in response to the first configuration of the plurality of switches, and forming a second capacitor network in response to the second configuration of the plurality of switches.
33. A method for protecting a charge pump power conversion circuit that receives first voltage from a first terminal and provides a second voltage on a second terminal, comprising:
converting, by the charge pump power conversion circuit, the first voltage to the second voltage; and
in response to a control signal, blocking, by a protection circuit electrically coupled to the charge pump power conversion circuit, a power flow from the first terminal to the second terminal and from the second terminal to the first terminal.

34. The method of clause 33, further comprising:
outputting the control signal to the protection circuit in response to a fault signal,
wherein the fault signal comprises an input under-voltage signal, an input over-voltage signal, an output under-voltage signal, an output over-voltage signal, a thermal shutdown signal, an input or output over-current signal, a timeout signal, or a charge pump capacitor under-voltage or over-voltage signal.
35. The method of clause 34, where the fault signal comprises a combination of two or more of: the input under-voltage signal, the input over-voltage signal, the output under-voltage signal, the output over-voltage signal, the thermal shutdown signal, the input or output over-current signal, the timeout signal, or the charge pump capacitor under-voltage or over-voltage signal.
36. The method of clause 34 or 35, further comprising:
outputting the fault signal according to a detection of the first voltage, the second voltage, a charge pump capacitor voltage, an input current, an output current, a thermal value, or a soft-start timeout.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. A power converter, comprising:
a first terminal configured to receive a first voltage;
a second terminal configured to output a second voltage, wherein the first and second voltages are DC voltages;
a charge pump power conversion circuit configured to be electrically coupled between the first terminal and the second terminal, and configured to convert the first voltage to the second voltage, wherein the charge pump power conversion circuit comprises:
a first switching device; and
a plurality of switches configured to:
switch between a first configuration and a second configuration in response to a first set of control signals associated with a normal operation of the charge pump power conversion circuit; and
connect a plurality of capacitors to form a first capacitor network in the first configuration and to form a second capacitor network in the second configuration, wherein the plurality of switches comprise a second switching device coupled to the first switching device to collectively form a protection circuit configured to, in response to a second control signal associated with a detection of a fault, block a power flow from the first terminal to the second terminal and from the second terminal to the first terminal;
a second protection circuit comprising a third switching device configured to, in response to the second control signal, block the power flow from the first terminal to the second terminal and from the second terminal to the first terminal; and a controller configured to determine whether to direct, based on a type associated with the fault, the second control signal to the second protection circuit, wherein the first switching device and the second switching device are configured to be electrically coupled between the first terminal and the charge pump power conversion circuit, and wherein the third switching device is configured to be electrically coupled between the second terminal and the charge pump power conversion circuit.

2. The power converter of claim 1, wherein the first switching device comprises a first power metal-oxide-semiconductor field-effect transistor (MOSFET) device, wherein the second switching device comprises a second power MOSFET device, and wherein a body diode of the first power MOSFET device and a body diode of the second power MOSFET device are coupled in an anti-series connection.

3. The power converter of claim 2, wherein the first power MOSFET device and the second power MOSFET device are MOSFET devices with different power ratings.

4. The power converter of claim 2, wherein the first power MOSFET device and the second power MOSFET device are both n-type MOSFET devices or both p-type MOSFET devices.

5. The power converter of claim 2, wherein the first power MOSFET device and the second power MOSFET device are back-to-back connected in a common source configuration or in a common drain configuration.

6. The power converter of claim 2, wherein the first power MOSFET device is an n-type MOSFET device and the second power MOSFET device is a p-type MOSFET device.

7. The power converter of claim 6, wherein a drain terminal of the p-type MOSFET device is coupled to a source terminal of the n-type MOSFET device.

8. The power converter of claim 6, wherein a drain terminal of the n-type MOSFET device is coupled to a source terminal of the p-type MOSFET device.

9. The power converter of claim 1, wherein the third switching device comprises a power metal-oxide-semiconductor field-effect transistor (MOSFET) device with a body bias selecting circuit configured to bias a body terminal of the power MOSFET device.

10. The power converter of claim 9, wherein the power MOSFET device is a p-type MOSFET device, and wherein the body bias selecting circuit is configured to selectively connect the body terminal to a source or drain terminal having a higher voltage.

11. The power converter of claim 9, wherein the power MOSFET device is a n-type MOSFET device, and wherein the body bias selecting circuit is configured to selectively connect the body terminal to a source or drain terminal having a lower voltage.

12. The power converter of claim 1, wherein the third switching device comprises:
a micro-electromechanical system (MEMS) switch configured to be switched from a first state to a second state in response to the second control signal, the MEMS switch comprising:
a first contact coupled to a first end of the third switching device; and
a second contact coupled to a second end of the third switching device,
wherein the second contact is configured to be electrically coupled to the first contact in the first state, and is configured to be electrically isolated from the first contact in the second state.

13. The power converter of claim 1, wherein the third switching device comprises one or more of a bipolar junction transistor (BJT) power device, a high electron mobility transistor (HEMT) device, a GaN device, a junction gate field-effect transistor (JFET) device, or a metal semiconductor field effect transistor (MESFET) device.

14. The power converter of claim 1, wherein the first switching device is configured to be electrically coupled between the first terminal and the charge pump power conversion circuit or configured to be electrically coupled between the second terminal and the charge pump power conversion circuit.

15. The power converter of claim 1, further comprising a third protection circuit comprising:
a fourth switching device configured to be electrically coupled between the charge pump power conversion circuit and a ground terminal and configured to, in response to the second control signal, block a power flow between the charge pump power conversion circuit and the ground terminal.

16. The power converter of claim 1, wherein the controller is further configured to:
provide the first set of control signals to the plurality of switches; and
provide the second control signal to the protection circuit in response to a fault signal,
wherein the fault signal comprises an input under-voltage signal, an input over-voltage signal, an output under-voltage signal, an output over-voltage signal, a thermal shutdown signal, an input or output over-current signal, a timeout signal, or a charge pump capacitor under-voltage or over-voltage signal.

17. The power converter of claim 16, where the fault signal comprises a combination of two or more of: the input under-voltage signal, the input over-voltage signal, the output under-voltage signal, the output over-voltage signal, the thermal shutdown signal, the input or output over-current signal, the timeout signal, or the charge pump capacitor under-voltage or over-voltage signal.

18. The power converter of claim 16, further comprising:
one or more detecting circuits configured to be electrically coupled to the controller and configured to output the fault signal according to a detection of the first voltage, the second voltage, a charge pump capacitor voltage, an input current, an output current, a thermal value, or a soft-start timeout.

19. The power converter of claim 1, wherein the power converter is configurable to selectively operate in a 5:1 configuration, 2:1 configuration, 1:5 configuration, or 1:2 configuration.

20. The power converter of claim 1, wherein the first switching device and the second switching device are each configured to receive the second control signal and open in response to the second control signal to block the power flow from the first terminal to the second terminal and from the second terminal to the first terminal.

21. A power converter, comprising:
a controller configured to:
implement a deadtime interval based, at least in part on one or more timing signals;
provide a first set of control signals; and
provide a second control signal in response to a detection of a fault to block a power flow in either direction between a first terminal of the power converter and a second terminal of the power converter;

a first switching device; and
a switched-capacitor network configured to be electrically coupled to the controller and configured to convert a first voltage at the first terminal to a second voltage at the second terminal, wherein the first and second voltages are DC voltages, the switched-capacitor network comprising:
  a plurality of switches configured to switch between a first configuration and a second configuration, wherein the controller is configured to control, based on the first set of control signals, the plurality of switches to connect a plurality of capacitors to form a first capacitor network in the first configuration and to form a second capacitor network in the second configuration, wherein the first set of control signals is associated with a normal operation of the switched-capacitor network, wherein the plurality of switches comprises a second switching device coupled to the first switching device to collectively form a protection circuit configured to, in response to the second control signal, block the power flow in either direction between the first terminal and the second terminal; and
a second protection circuit comprising a third switching device configured to, in response to the second control signal, block the power flow from the first terminal to the second terminal and from the second terminal to the first terminal; and
wherein:
  the controller is further configured to determine whether to direct, based on a type associated with the fault, the second control signal to the second protection circuit;
  the first switching device and the second switching device are configured to be electrically coupled between the first terminal and the switched-capacitor network; and
  the third switching device is configured to be electrically coupled between the second terminal and the switched-capacitor network.

22. The power converter of claim 21, wherein the first switching device is configured to be electrically coupled to the first terminal or the second terminal, and configured to open a current path between the switched-capacitor network and the first terminal or the second terminal in response to the second control signal.

23. The power converter of claim 22, further comprising:
a fourth switching device coupled to a ground terminal and configured to open a current path between the ground terminal and the switched-capacitor network in response to the second control signal, wherein the fourth switching device comprises at least one of the plurality of switches in the switched-capacitor network.

24. The power converter of claim 21, wherein:
the first switching device comprises a first power metal-oxide-semiconductor field-effect transistor (MOSFET) device;
the second switching device comprises a second power MOSFET device;
a body diode of the first power MOSFET and a body diode of the second power MOSFET device are coupled in an anti-series connection; and
the protection circuit is configured to open a current path between the first terminal and the second terminal in response to the second control signal.

25. The power converter of claim 24, wherein the plurality of switches comprises:
a third power MOSFET device and a fourth power MOSFET device having body diodes coupled in an anti-series connection and configured to open a current path between the first terminal and a ground terminal in response to the second control signal.

26. The power converter of claim 21, further comprising:
one or more detecting circuits configured to be electrically coupled to the controller and configured to output one or more fault signals when a fault is detected according to the first voltage, the second voltage, a charge pump capacitor voltage, an input current, an output current, a thermal value, or a soft-start timeout,
wherein the controller is configured to provide the second control signal in response to the one or more fault signals, wherein the one or more fault signals comprise an input under-voltage signal, an input over-voltage signal, an output under-voltage signal, an output over-voltage signal, a thermal shutdown signal, an input or output over-current signal, a timeout signal, or a charge pump capacitor under-voltage or over-voltage signal.

27. A power converter, comprising:
a power conversion circuit comprising first, second, and third terminals, wherein the power conversion circuit is configured to convert, in response to a first set of control signals associated with a normal operation of the power conversion circuit, a first voltage received from at least one of the first, second, and third terminals to a second voltage outputted at least of one of the first, second, and third terminals, wherein the first and second voltages are DC voltages, wherein the power conversion circuit comprises a first switching device;
two or more switching circuits configured to be electrically coupled to the power conversion circuit and configured to provide or block a bidirectional current path between one of the first, second, and third terminals and another one of the first, second, and third terminals according to a second control signal in response to a detection of a fault, wherein a first switching circuit of the two or more switching circuits comprises a second switching device coupled to the first switching device to collectively form a protection circuit configured to, in response to the second control signal, block the bidirectional current path, wherein the power conversion circuit and the protection circuit share at least one power switch of the first switching device, and wherein a second switching circuit of the two or more switching circuit comprises a third switching device;
a second protection circuit comprising the third switching device, wherein the third switching device is configured to, in response to the second control signal, block power flow from the first terminal to the second terminal and from the second terminal to the first terminal;
a controller configured to determine whether to direct, based on a type associated with the fault, the second control signal to the second protection circuit; and
one or more detecting circuits configured to be electrically coupled to the one of the first, second, and third terminals and configured to detect whether the fault has occurred, wherein the first switching device and the second switching device are configured to be electrically coupled between the first terminal and the power conversion circuit, and wherein the third switching device is configured to be electrically coupled between the second terminal and the power conversion circuit.

28. The power converter of claim 27,
wherein the second switching circuit of the two or more switching circuits comprises a pair of power metal-oxide-semiconductor field-effect transistor (MOSFET) devices having body diodes coupled in an anti-series connection.

29. The power converter of claim 27,
wherein the second switching circuit of the two or more switching circuits comprises power metal-oxide-semiconductor field-effect transistor (MOSFET) device with a body bias selecting circuit configured to bias a body terminal of the power MOSFET device.

30. The power converter of claim 27, wherein the second switching circuit of the two or more switching circuits comprises a micro-electromechanical system (MEMS) switch configured to be switched between an on state and an off state in response to the second control signal.

31. The power converter of claim 27, wherein the second switching circuit of the two or more switching circuits comprises one or more of a bipolar junction transistor (BJT) power device, a high electron mobility transistor (HEMT) device, a GaN device, a junction gate field-effect transistor (JFET) device, or a metal semiconductor field effect transistor (MESFET) device.

32. The power converter of claim 27, wherein:
the first switching circuit is configured to be electrically coupled between the power conversion circuit and the first terminal and configured to disconnect the power conversion circuit from the first terminal in response to the detection of the fault; and
the second switching-circuit of the two or more switching circuits is configured to be electrically coupled between the power conversion circuit and the second terminal and third terminals and configured to disconnect the power conversion circuit from the second terminal in response to the detection of the fault.

33. The power converter of claim 32, wherein a third switch circuit of the two or more switching circuits comprises:
a fourth switching device configured to be electrically coupled between the power conversion circuit and the third terminal and configured to disconnect the power conversion circuit from the third terminal in response to the detection of the fault.

34. The power converter of claim 27, wherein the power conversion circuit comprises a switched-capacitor network, the switched-capacitor network comprising:
a plurality of switches configured to switch between a first configuration and a second configuration in response to the first set of control signals, wherein the plurality of switches comprises the first switching device; and
a plurality of capacitors configured to form a first capacitor network in response to the first configuration of the plurality of switches, and configured to form a second capacitor network in response to the second configuration of the plurality of switches.

35. A method for protecting a charge pump power conversion circuit that receives first voltage from a first terminal and provides a second voltage on a second terminal, the method comprising:
converting, by the charge pump power conversion circuit, the first voltage to the second voltage, wherein the converting comprises switching, by a plurality of switches of the charge pump power conversion circuit in response to a first set of control signals during a normal operation of the charge pump power conversion circuit, between a first configuration and a second configuration to connect a plurality of capacitors of the charge pump power conversion circuit to form a first capacitor network in the first configuration and to form a second capacitor network in the second configuration, wherein the first and second voltages are DC voltages; and
in response to a second control signal associated with a detection of a fault, blocking, by a protection circuit electrically coupled to the charge pump power conversion circuit, a power flow from the first terminal to the second terminal and from the second terminal to the first terminal, wherein the protection circuit is formed of a first switching device and a second switching device, wherein the blocking comprises turning off the first switching device and the second switching device, and wherein the second switching device is one of the plurality of switches of the charge pump power conversion circuit;
determining, by a controller, whether to direct, based on a type associated with the fault, the second control signal to a second protection circuit;
blocking, by a third switching device of the second protection circuit, the power flow from the first terminal to the second terminal and from the second terminal to the first terminal in response to the second control signal when the second control signal is directed to the second protection circuit, wherein the first switching device and the second switching device are electrically coupled between the first terminal and the charge pump power conversion circuit, and wherein the third switching device is electrically coupled between the second terminal and the charge pump power conversion circuit.

36. The method of claim 35, further comprising:
outputting the second control signal to the protection circuit in response to a fault signal,
wherein the fault signal comprises an input under-voltage signal, an input over-voltage signal, an output under-voltage signal, an output over-voltage signal, a thermal shutdown signal, an input or output over-current signal, a timeout signal, or a charge pump capacitor under-voltage or over-voltage signal.

37. The method of claim 36, where the fault signal comprises a combination of two or more of: the input under-voltage signal, the input over-voltage signal, the output under-voltage signal, the output over-voltage signal, the thermal shutdown signal, the input or output over-current signal, the timeout signal, or the charge pump capacitor under-voltage or over-voltage signal.

38. The method of claim 36, further comprising:
outputting the fault signal according to a detection of the first voltage, the second voltage, a charge pump capacitor voltage, an input current, an output current, a thermal value, or a soft-start timeout.

* * * * *